(12) United States Patent
Lacey et al.

(10) Patent No.: US 10,963,315 B2
(45) Date of Patent: *Mar. 30, 2021

(54) SYNCHRONIZATION AND EXCHANGE OF DATA BETWEEN PROCESSORS

(71) Applicant: Graphcore Limited, Bristol (GB)

(72) Inventors: David Lacey, Cheltenham (GB); Daniel John Pelham Wilkinson, West Harptree (GB); Richard Luke Southwell Osborne, Bristol (GB); Matthew David Fyles, Wiltshire (GB)

(73) Assignee: Graphcore Limited, Bristol (GB)

( * ) Notice: Subject to any disclaimer, the term of this patent is extended or adjusted under 35 U.S.C. 154(b) by 72 days.

This patent is subject to a terminal disclaimer.

(21) Appl. No.: 16/276,834

(22) Filed: Feb. 15, 2019

(65) Prior Publication Data

US 2020/0012536 A1 Jan. 9, 2020

(30) Foreign Application Priority Data

Jul. 4, 2018 (GB) ..................................... 1811017
Dec. 24, 2018 (GB) ..................................... 1821193

(51) Int. Cl.
*G06F 9/52* (2006.01)
*G06F 9/30* (2018.01)
(Continued)

(52) U.S. Cl.
CPC .......... *G06F 9/522* (2013.01); *G06F 9/30043* (2013.01); *G06F 9/3877* (2013.01);
(Continued)

(58) Field of Classification Search
None
See application file for complete search history.

(56) References Cited

U.S. PATENT DOCUMENTS 5,928,351 A * 7/1999 Horie .................... G06F 9/52
712/11
6,011,793 A * 1/2000 Smith ................ H04L 12/5601
370/395.7
(Continued)

FOREIGN PATENT DOCUMENTS

CN 101586961 A 11/2009
CN 102132249 A 7/2011
(Continued)

OTHER PUBLICATIONS

Anonymous: "Synchronization (computer science)—Wikipedia", Sep. 19, 2017 (Sep. 19, 2017), pp. 1-9, XP055566993, Retrieved from the Internet: URL:https://en.wikipedia.org/w/index.php? title=Synchronization_(computer_science)&oldid=801376314 [retrieved on Mar. 11, 2019].
(Continued)

*Primary Examiner* — Isaac T Tecklu
(74) *Attorney, Agent, or Firm* — Haynes and Boone, LLP

(57) ABSTRACT

A system comprising: a first subsystem comprising one or more first processors, and a second subsystem comprising one or more second processors. The second subsystem is configured to process code over a series of steps delineated by barrier synchronizations, and in a current step, to send a descriptor to the first subsystem specifying a value of each of one or more parameters of each of one or more interactions that the second subsystem is programmed to perform with the first subsystem via an inter-processor interconnect in a subsequent step. The first subsystem is configured to execute a portion of code to perform one or more preparatory operations, based on the specified values of at least one of the one or more parameters of each interaction as specified by the descriptor, to prepare for said one or more
(Continued)

interactions prior to the barrier synchronization leading into the subsequent phase.

24 Claims, 22 Drawing Sheets

(51) Int. Cl.
    *G06F 9/38*     (2018.01)
    *G06F 9/54*     (2006.01)
    *G06F 9/48*     (2006.01)
    *G06F 16/901*     (2019.01)
    *G06F 15/167*     (2006.01)
    *G06F 15/173*     (2006.01)
    *H04L 12/801*     (2013.01)
    *H04L 29/06*     (2006.01)
    *H04L 29/08*     (2006.01)

(52) U.S. Cl.
    CPC ............ *G06F 9/544* (2013.01); *G06F 15/167* (2013.01); *G06F 15/17331* (2013.01); *G06F 16/9017* (2019.01); *H04L 47/39* (2013.01); *H04L 65/104* (2013.01); *H04L 67/1095* (2013.01); *H04L 67/1097* (2013.01); *G06F 9/4881* (2013.01)

(56) References Cited

U.S. PATENT DOCUMENTS

| | | | |
|---|---|---|---|
| 7,512,950 B1* | 3/2009 | Marejka | G06F 9/52 718/102 |
| 7,636,835 B1 | 12/2009 | Ramey | |
| 7,861,060 B1 | 12/2010 | Nickolls | |
| 8,151,088 B1 | 4/2012 | Bao | |
| 9,158,575 B2* | 10/2015 | Smith | G06F 9/4843 |
| 10,210,134 B2 | 2/2019 | Burchard | |
| 2004/0130552 A1 | 7/2004 | Duluk | |
| 2006/0212868 A1* | 9/2006 | Takayama | G06F 9/52 718/100 |
| 2009/0064167 A1 | 3/2009 | Arimilli | |
| 2009/0177867 A1 | 7/2009 | Garde | |
| 2010/0115236 A1* | 5/2010 | Bataineh | G06F 9/52 712/29 |
| 2012/0179896 A1* | 7/2012 | Salapura | G06F 9/30087 712/203 |
| 2014/0026138 A1* | 1/2014 | Itou | G06F 9/52 718/102 |
| 2015/0143085 A1 | 5/2015 | Khan | |
| 2015/0193341 A1* | 7/2015 | Ye | G06F 12/06 711/202 |
| 2016/0342185 A1 | 11/2016 | Rodriguez | |
| 2017/0052876 A1 | 2/2017 | Svensson | |
| 2017/0220499 A1 | 8/2017 | Gray | |
| 2017/0277567 A1* | 9/2017 | Lai | G06F 9/3851 |
| 2019/0121641 A1* | 4/2019 | Knowles | G06F 15/80 |
| 2019/0121680 A1* | 4/2019 | Wilkinson | G06F 9/485 |
| 2019/0121785 A1* | 4/2019 | Wilkinson | G06F 15/17325 |
| 2019/0155768 A1* | 5/2019 | Wilkinson | G06F 15/16 |
| 2020/0012533 A1* | 1/2020 | Torudbakken | G06N 20/00 |
| 2020/0014560 A1* | 1/2020 | Torudbakken | G06F 9/223 |

FOREIGN PATENT DOCUMENTS

| | | |
|---|---|---|
| CN | 102782672 | 11/2012 |
| CN | 103108000 A | 5/2013 |
| EP | 2441013 | 8/2014 |
| TW | 201510860 A | 3/2015 |
| WO | 2009158690 A2 | 12/2009 |
| WO | 2017069900 | 4/2017 |

OTHER PUBLICATIONS

"PCI Express Base Specification Revision 3.0; Introduction and Physical Layer Specification", Nov. 10, 2010 (Nov. 10, 2010), pp. 37-412, XP055096393, Retrieved from the Internet: URL:http://komposter.com.ua/documents/PCI_Express_Base_Specification_Revision_3.0.pdf [retrieved on Jan. 14, 2014].
International Search Report and Written Opinion dated Aug. 20, 2019 for PCT Patent Application No. PCT/EP2019/067375.
Office Action for Canadian patent application 3,021,409 dated Oct. 7, 2019. 3 pages.
Third Party Submission in Patent Application No. GB1816930.0, Observations dated Feb. 4, 2020.
Examination Report for Patent Application No. GB1816930.0 dated Feb. 13, 2020.
Office Action for TW Patent Application No. 107136465 dated Sep. 11, 2019.
Combined Search and Examination Report for United Kingdom Patent Application No. GB1821193.8 dated Jun. 12, 2019. 5 pages.
Search Report for Taiwan Patent Application No. 107136871 dated Jul. 4, 2019.
International Search Report and Written Opinion for International Application No. PCT/EP2018/077675 dated Jan. 18, 2019.
Gonzalez et al., Groups in Bulk Synchronous Parallel Computing. 8th Euromicro Workshop: Parallel and Distributed Processing. Jan. 19, 2000. p. 244-251.
Khunayn et al., Straggler Mitigation for Distributed Behavioral Simulation. 2017 IEEE 37th International Conference on Distributed Computing Systems. May 6, 2017. 4 pages.
Krstic et al., Globally Asynchronous, Locally Synchronous Circuits: Overview and Outlook. IEEE Design& Test of Computers. IEEE Service Center, New York, NY. 2007;24(5):430-441. doi: 10.1109/mdt.2007.164.
UK Search Report for Application No. GB 1717294.1 dated Apr. 26, 2019.
UK Search Report for Application No. GB1816930.3 dated Apr. 24, 2019.
UK Combined Search and Examination Report for Application No. GB1717293.3 dated Apr. 16, 2019.
Cha et al., H-BSP: A Hierarchical BSP Computation Model. The Journal of Supercomputing, Feb. 2001;18(2):179-200.
Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.
Valiant, A bridging model for parallel computation. Communications of the ACM, Aug. 1990;33(8):103-11.
Combined Search and Examination Report for Application No. GB1819606.3 dated Feb. 26, 2020.
Lu, Xiaoyi, et al., Characterizing Deep Learning Over Big Data (DLoBD) Stacks on RDMA-Capable Networks. 2017 IEEE 25th Annual Symposium on High-Performance Interconnects. Department of Computer Science and Engineering, The Ohio State University. pp. 87-94.
Ovalle, John Edilson Arevalo, et al, "Distributed Cache Strategies for Machine Learning Classification Tasks over Cluster Computing Resources". Springer-Verlag Berlin Heidelberg, 2014. pp. 43-53.
Jin, Tong, et al., "Exploring Data Staging Across Deep Memory Hierarchies for Coupled Data Intensive Simulation Workflows", 2015 IEEE 29th International Parallel and Distributed Processing Symposium. pp. 1033-1042.
Office Action for Taiwan patent application 10821013930 dated Oct. 28, 2019, 4 pages.

* cited by examiner

SYNCHRONIZATION AND EXCHANGE OF DATA BETWEEN PROCESSORS

CROSS-REFERENCE TO RELATED APPLICATIONS

This application claims the priority benefit under 35 U.S.C. § 119 of United Kingdom Patent Application No. 1821193.8, filed Dec. 24, 2018, and United Kingdom Patent Application No. 1811017.1, filed Jul. 4, 2018, the entire contents of which are incorporated herein by reference.

TECHNICAL FIELD

The present disclosure relates to the interaction between a first subsystem comprising at least one first processor, such as a host processor, and a second subsystem comprising one or more second processors such as accelerator processors to which the host assigns work. The disclosure also relates to a synchronization scheme such as BSP (bulk synchronous parallel) whereby execution is divided into a plurality of steps with barrier synchronizations therebetween.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the code run on the different tiles to communicate between tiles. In some cases the processing unit on each tile may itself run multiple concurrent threads on tile, each tile having its own respective set of contexts and corresponding pipeline as described above in order to support interleaving of multiple threads on the same tile through the same pipeline.

In general, there may exist dependencies between the portions of a program running on different tiles. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile in the compute phase may be allowed to communicate with other system resources such as a network card or storage disk, as long as no communication with other tiles in the group is involved.

In an interconnected system of senders and receivers that may also have compute tasks to perform in between communicating with one another, there are essentially three ways the senders and receivers can implement this. The first is the "rendezvous" approach. According to this approach the sender signals to the receiver when it is ready to send data and the receiver signals to the sender when it is ready to receive data. If the sender has data ready to send but the receiver is performing some other, compute task, then the sender must either wait for the receiver to finish its computing task and signal its readiness to receive data from the sender, or else the sender must interrupt the receiver. Similarly if the receiver requires data from the sender while the sender is still performing some other, compute task, then the receiver must either wait for the sender to finish its compute task and signal its readiness to send data to the receiver, or else the receiver must interrupt the sender. The rendezvous approach has the advantage that it does not require queues to queue the transmitted data, since communication of the data only proceeds once both sender and receiver have agreed they are ready to communicate. However, the downside is latency: the senders and receivers will spend a lot of time waiting for one another, or else will have to perform a lot of interrupts which also incur a latency penalty. The latency ultimately manifests itself as reduced throughput.

The second possibility is the "post-box" approach. According to this approach the sender does not wait for the receiver before sending its data. Instead the transmitted data is buffered in a queue, from which the receiver reads the data when it is ready. As long as the queues are long enough then this solves the latency problem of the rendezvous approach. However, if the queues fill up then the process stalls and in effect the communications fall back to the rendezvous approach. To reduce the chance of this the queues need to be made long compared to the amount of data likely to be transmitted. But queues incur a significant silicon footprint, especially in an array of many potential combinations of senders and receivers. Also, in practice the queues cannot be made indefinitely long.

Bulk synchronous parallel (BSP) provides a third way: each tile performs a certain defined amount of compute processing in a compute phase, then all tiles synchronize together (a barrier synchronization) before advancing to an exchange phase. This does not incur as much latency as the rendezvous approach, and does not incur as much queuing as the post-box approach.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

SUMMARY

It is recognized herein that, in a scenario where two or more processors are operating in a synchronized manner, it would be desirable to enable one processor to prepare in advance of the next barrier for a transaction that the other processor is going to perform following that barrier. Consider a case where a first processor (e.g. host CPU) is coupled to a second processor (e.g. an accelerator processor), and at least the second processor is configured to operate over a series of steps or stages (e.g. BSP supersteps) which are synchronized with the first processor by means of a series of barrier synchronizations. That is, the second processor has to wait for agreement from first processor before the second processor can proceed to its next stage of execution. This may be referred to in the art as a barrier. E.g. to pass the barrier the second processor raises a sync request to indicate it is ready to advance to the next step, and then must wait for a sync acknowledgment in response before it can proceed. After the barrier, the second processor may request to perform an interaction with the first processor, which could involve, for example, the first processor needing to ensure some space is reserved in its own memory for the transaction, or ensuring that the requested data is generated in the case of a transfer from the first to the second processor. This preparation needs to be performed before the interaction can occur. It will therefore incur some delay before the interaction can occur if not performed already. However, if the first processor could know about the upcoming interaction before the barrier, it could perform some or all of the necessary preparation.

Such scenarios can even occur in the case of a statically compiled graph where the code run on the two (or more) processors has been pre-compiled to operate together, since some interactions between processors may be data dependent. I.e. the compiler cannot necessarily know which type of interaction the second processor is going to perform in step s+1 so cannot predetermine what preparations the first processor should make in step s, because the type of interaction that the second processor is to perform in step n may depend on, e.g., the result of a calculation, a pseudorandom number or an external stimulus.

Similar situations can also occur more generally when a first subsystem comprising one or more first processors interacts with a second subsystem comprising one or more second processors, where at least one of the second processors is to interact with at least one of the first processors. For instance the second subsystem may comprise an array of accelerator processors (XPUs), and/or the first subsystem may comprise a host CPU and one or more gateway processors for acting as a gateway between host CPU and the accelerator(s).

To address the above situations or similar, the present disclosure provides a mechanism whereby, in a particular step (where steps are delineated by barrier synchronizations), a second processor (e.g. XPU) sends the first processor (e.g. host CPU or gateway) a descriptor of the second processor's intended interactions with the first processor. The first processor can then prepare for the next step accordingly, such as to prepare its memory. For instance this may comprise reserving a suitable portion of memory, or ensuring the required data is generated and stored in memory in the case of a transfer from first to second processor. The descriptor specifies one of a set of predetermined interactions, which may be pre-compiled by the compiler. E.g. the second processor tells the first it is going to read from a certain specified stream, or that it is going to write to a certain specified stream. For instance the streams could be sequences of images, audio streams, or other experience data which are being used for machine learning, such as to train a neural network. The first processor (e.g. host) can then use the information on the specified interaction, for instance, to ensure the pipe is kept full or to pull data out of the pipe accordingly.

According to one aspect disclosed herein there is provided a processing system comprising a first subsystem comprising one or more first processors, and a second subsystem comprising one or more second processors. The second subsystem is configured to process code over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem. The second subsystem is further configured, in a current one of said steps, to send a descriptor to the first subsystem specifying a value of each of one or more parameters of each of one or more interactions that the second subsystem is programmed to perform with the first subsystem via an inter-processor interconnect in a subsequent one of said steps. The first subsystem is configured to execute a portion of code to perform one or more preparatory operations, based on the specified values of at least one of the one or more parameters of each interaction as specified by the descriptor, to prepare for said one or more interactions prior to the barrier synchronization leading into said subsequent step.

In embodiments, the first subsystem may store one or more look-up tables mapping each of a set of behaviour IDs to a different respective one of a plurality of different possible predetermined definitions for said interaction, each definition comprising a respective set of values for said one or more parameters. In this case the descriptor specifies the specified values of the one or more parameters of each interaction by indicating one of the behaviour IDs; and the first subsystem is configured to determine the specified values by looking up the definition mapped to the indicated behaviour ID in said one or more look-up tables, and to perform said one or more preparatory operations based on the respective set of values of the looked-up definition.

In embodiments, at least one of the one or more interactions may be to transfer data between the second subsystem and a memory of the first subsystem, and the one or more preparatory operations may comprise one or more operations to prepare the memory for the transfer.

In embodiments, the at least one parameter may comprise a direction of the transfer, the direction being either: incoming from the second subsystem to the memory of the first subsystem, or outgoing from the memory of the first subsystem to the second subsystem.

In embodiments, the transfer may comprise transferring an incoming portion of data from the second subsystem to the memory of the first subsystem, and said at least one parameter may comprise at least a size of the incoming portion of data. In this case, said one or more preparatory operations may comprise at least: reserving a corresponding amount of space in the memory ready to accept the incoming portion of data from the second subsystem in the subsequent step.

In embodiments, the transfer may comprise transferring an outgoing portion of data to the second subsystem from the memory of the first subsystem, and said at least one parameter may comprise at least a size of the outgoing portion of data. In this case, said one or more preparatory operations may comprise one, more or all of: reserving a corresponding amount space in the memory to store the outgoing portion of data, generating the outgoing portion of data, and storing the outgoing portion of data in the memory ready to send to the second subsystem in the subsequent step.

In embodiments, the memory may comprise a FIFO buffer and the reserved space is space in the FIFO.

In embodiments, at least one of said one or more interactions may be to transfer the data as part of a stream; and the one or more parameters for each stream may comprise at least a stream ID identifying a stream, an indication that the second subsystem is to begin streaming between the second subsystem and the memory of the first subsystem in the subsequent step, and a direction of the stream.

In embodiments, the stream ID may be mapped to the behaviour ID in a first of said look-up tables, and the portion size and direction may be mapped to the stream ID in a second of said look-up tables.

In embodiments, said subsequent step may be the next step following the current step in said series by default. Alternatively, said subsequent step may be operable to be any of a number of steps following the current step in said series. Said number may be specified by the descriptor.

In some embodiments, the descriptor may specify at least one interaction for each of the next N steps following the current step in said series, where N is specified by the descriptor. In this case, the first subsystem is configured to prepare for each of said N steps prior to the respective barrier leading into each.

In embodiments, the processing system may further comprise synchronization logic configured to return the synchronization acknowledgement signal to the second subsystem on condition of: i) receiving a synchronization request signal from the second subsystem, and ii) receiving permission from the first subsystem system to return the synchronization acknowledgement.

In embodiments, the synchronization logic may comprise a register for storing a number of credits, the register being writeable by the first subsystem. In this case, said permission is granted when the register is written with at least one credit but denied when the credits are exhausted, and the synchronization logic is configured to automatically decrement the number of credits in the register each time an instance of the synchronization acknowledgement signal is returned to the second subsystem.

In embodiments, each of the one or more second processors may comprise an array of tiles each comprising a respective execution unit and memory, the tiles being arranged to exchange data with one another by an inter-tile interconnect.

In embodiments, the inter-tile interconnect may be a time-deterministic interconnect for exchanging data between the tiles in a time-deterministic manner; but the inter-processor interconnect may be a non-time-deterministic interconnect for performing said exchange of data between the first subsystem and second subsystem only in a non-time-deterministic manner.

In embodiments, the first second subsystem may be configured to send said synchronization request on condition of receiving an individual request for synchronization from each of the tiles.

In embodiments, the second subsystem may comprise a plurality of second processors configured to communicate via the inter-processor interconnect.

In embodiments, the second subsystem may be configured to send said synchronization request on condition of receiving an individual request for synchronization from each of said plurality of second processors.

In embodiments, the first subsystem may comprise a host subsystem, the one or more first processors comprising at least one host CPU and optionally one or more gateway processors arranged as a gateway between the host CPU and the second subsystem; and the second subsystem may comprise an accelerator subsystem, the one or more second processors comprising one or more accelerator processors arranged to perform work allocated by the host CPU.

In embodiments, each of said steps may comprise a bulk synchronous parallel, BSP, superstep. In this case, each superstep comprises an exchange phase following the barrier synchronization, wherein in the exchange phase the first and second subsystems perform said interaction. Each superstep then comprises a compute phase following the exchange phase, wherein in the exchange phase the first and second subsystems perform only computations or internal exchanges but not exchanges between the first and second subsystems. The next barrier synchronization follows the compute phase.

In embodiments, the code on the second subsystem and the portion of code on the first subsystem may be statically pre-compiled to operate together to perform said interaction.

According to another aspect disclosed herein there is provided method of operating a system comprising a first subsystem comprising one or more first processors, and a second subsystem comprising one or more second processors, the method comprising: arranging the second subsystem to process code over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem; in a current one of said steps, sending a descriptor from the second subsystem to the first subsystem specifying a value of each of one or more parameters of each of one or more interactions that the second subsystem is programmed to perform with the first subsystem via an inter-processor interconnect in a subsequent one of said steps; and on the first subsystem, executing a portion of code to perform one or more preparatory operations, based on the specified values of at least one of the one or more parameters of each interaction as specified by the descriptor, to prepare for said one or more interactions prior to the barrier synchronization leading into said subsequent step.

According to another aspect disclosed herein there is provided a computer program embodied on computer-readable storage and configured so as when run on a system comprising a first subsystem comprising one or more first processors, and a second subsystem comprising one or more second processors, to perform operations of: controlling the second subsystem to run at least part of the program over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem; in a current one of said steps, controlling the second subsystem to send a descriptor to the first subsystem specifying a value of each of one or more parameters of each of one or more interactions that the second subsystem is programmed to perform with the first subsystem via an inter-processor interconnect in a subsequent one of said steps; and controlling the first subsystem to perform one or more preparatory operations, based on the specified values of at least one of the one or more parameters of each interaction as specified by the descriptor, to prepare for said one or more interactions prior to the barrier synchronization leading into said subsequent step.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

Figure 21:
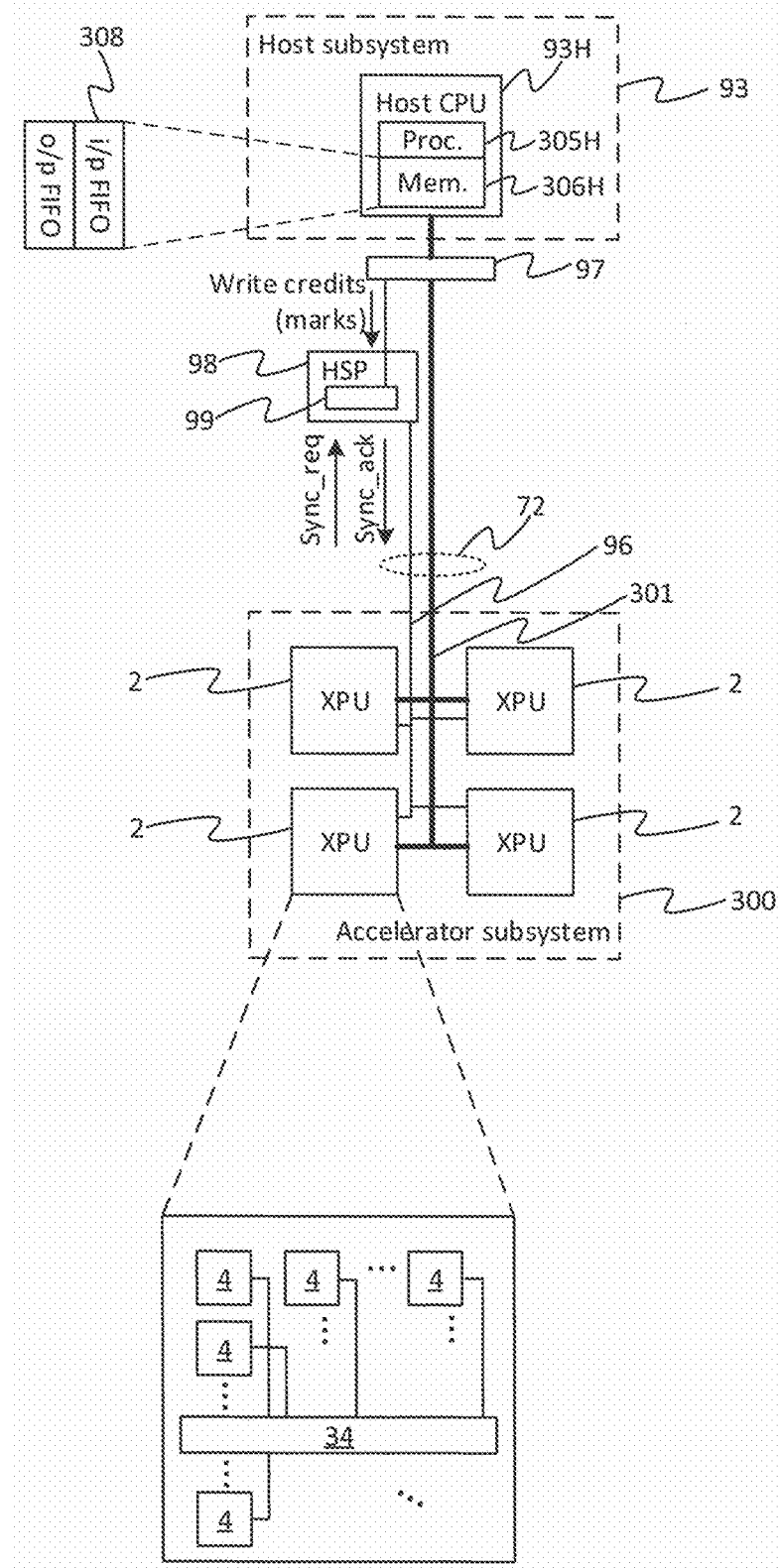
FIG. 21, is a schematic block diagram of a host subsystem and accelerator subsystem.

FIG. 21 shows an example system in accordance with embodiments of the present disclosure. The system comprises a first processing subsystem 93 comprising at least one first processor, and a second processing subsystem 300 comprising one or more second processors 2. The first subsystem 93 may be a host subsystem and the second subsystem may be an accelerator subsystem. That is, the at least one first processor may be a host processor (host CPU) 93H configured with the role of a host, for allocating work; and each of the one or more second processors 2 may be an accelerator processor ("XPU"), i.e. a co-processor which is arranged to perform work allocated by the host processor 93H. The host processor 93H is privileged and the accelerator devices 2 undertake work delegated by the host processor 93H. In embodiments each of the accelerator processors 2 may take the form of an IPU ("Intelligence Processing Unit") designed specially for use as a machine intelligence accelerator processor.

Embodiments below will be described in terms of the first subsystem 93 taking the role of a host subsystem and the second subsystem 300 taking the role of an accelerator subsystem. Embodiments will also be described in terms of the accelerator subsystem 300 comprising a plurality of second processors 2. However it will be appreciated that such features are not necessarily limiting, and more generally the teachings below can apply to any arrangement of a first subsystem 93 comprising one or more first processors (e.g. 93H) and a second subsystem 300 comprising one or more second processors 2, where the first and second subsystems synchronize by means of a barrier synchronization, and wherein at least one of the one or more second processors is to perform an interaction with at least one of the one or more first processors following the barrier.

The multiple accelerator processors 2 are connected together by an inter-processor interconnect 72. For instance each of the processors 2 may be implemented on a separate chip (die) and the inter-processor interconnect 72 may take the form of an external interconnect, i.e. inter-chip interface. The chips could be packaged on the same integrated circuit (IC) package, or different packages, or some on the same package and some on different packages. The inter-processor interconnect 72 also connects the accelerator processors 2 to the host processor 93H via a suitable host interface 97 such as a PCI, PCIe or Ethernet interface. The inter-processor interconnect 72 comprises a network of data paths 301 for exchanging data between accelerator processors 2 and/or between accelerator 2 and host processor 93H.

The interconnect 72 also comprises a mechanism for synchronizing between the processor(s) 93H of the host subsystem 93 and the processor(s) 2 of the accelerator subsystem 300, and in embodiments also for synchronizing between the accelerator processors 2 of the accelerator subsystem 300. In embodiments this mechanism takes the form of a synchronization (sync) network 96 separate from the data paths 301 of the inter-processor interconnect 72. Examples of this will be discussed in more detail shortly.

In embodiments the inter-processor interconnect 72 is a non-time-deterministic interconnect, in that the transmission of data over the data paths 301 of this interconnect 72 (as opposed to sync signalling over the sync network 96) is non-time-deterministic in nature. I.e. the timing cannot be known or at least not guaranteed, e.g. because delivery is not guaranteed and therefore may require retransmission. An example of a non-time-deterministic interconnect 72 will be discussed later in more detail with reference to FIG. 19.

The host processor 93H comprises a respective processing unit 305H and memory 306H. Each of the accelerator processors 2 also comprises at least one respective processing unit and memory. In embodiments, each of one, some or all of the accelerator processors 2 may comprise a respective array of tiles 4. In embodiments the tiles 4 of a given processor 2 are implemented on the same chip (die) as one another. Each tile 4 comprises a respective processing unit 10 and memory 11, examples of which are discussed in more detail later with reference to FIG. 1. In embodiments the processing unit 10 on each of the tiles 4 is a multithreaded processing unit 10 for running multiple concurrent threads on the tile 4. The tiles 4 are connected together via an internal, inter-tile interconnect 34 which enables transfer of data between tiles 4. In embodiments the inter-tile interconnect 34 may be a time-deterministic interconnect, enabling time-deterministic exchange of data between tiles 4. An example implementation of this will be described in more detail later with reference to FIGS. 16 and 17. The internal interconnect 34 may also enable synchronization between tiles 4. Further example details of this will be discussed in relation to, e.g., FIGS. 7 and 11

Figure 22:
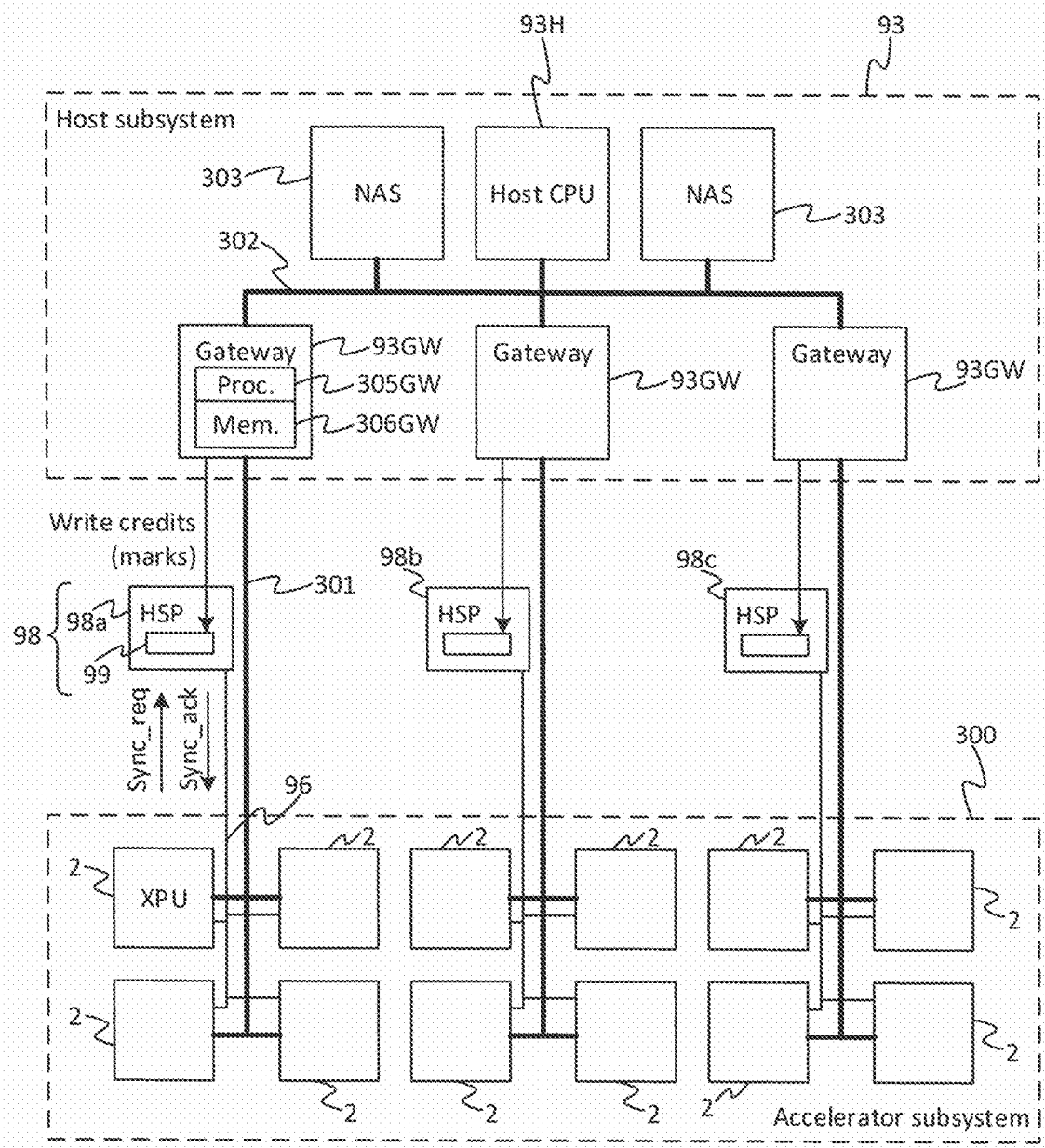
FIG. 22 is another schematic block diagram of a host and accelerator subsystem.

FIG. 22 illustrates an example variant of the system shown in FIG. 21. Here the host subsystem 93 comprises a plurality of first processors, e.g. a host processor (host CPU) 93H and one or more gateway processors 93GW. The host processor 93H comprises a respective processing unit 305H and memory 306H as described in relation to FIG. 21. Each of the gateway processors 93GW also comprises a respective processing unit 305GW and memory 306GW. The one or more gateways 93GW are arranged as intermediaries between the host CPU 93H and the accelerator processors 2. Each gateway 93GW is connected to one or more of the accelerator processors 2 via the host interface 97 and the inter-processor interconnect 72. E.g. each gateway 93 may be connected to a different respective subset of the accelerators 2 (consisting of one or more of the accelerators 2) via a respective instance of the host interface 97 and a different respective part of the inter-processor interconnect 72, as shown. Alternatively it is not excluded that a given accelerator 2 could connect to the host subsystem 93 via multiple gateways 93GW. Either way, each of the gateways 93GW is connected on the other side to the host CPU 93H. This connection may for example be via a host network 302, e.g. a PCI, PCIe or Ethernet network. One or more of the gateways 93GW may also be connected to one or more network attached storage devices (NASs) 303, i.e. storage drives such as hard disks or flash drives. For example the NASs may also be connected on the host network 302.

The gateway(s) 93GW may have any one or more of a number of roles. For instance, in embodiments, one or more of the gateways 93GW are arranged to act as buffers for streams of data such as sequences of images, audio streams or other streams of experience data which are to be streamed to the accelerator processors 2 in order for the accelerators 2 to conduct machine learning based thereon; e.g. to train a neural network to identify objects, faces, sounds, or other structures in the received experience data. The use of the gateway 93GW in this way may be desirable since it relieves the resources of host memory 305H. Instead at least some of the data destined for the accelerators 2 is buffered in the respective memory 306GW of the gateway(s) 93GW in question. In some cases the gateway(S) 93GW may be arranged to retrieve some or all of the streams directly from one or more of the NASs 303, e.g. via the host network 302, rather than the data having to go through the host memory 305H.

Alternatively or additionally, in embodiments one or more of the gateways 93GW may be arranged to pre-process the data (e.g. streams of experience data) prior to supply to the accelerator processors 2. For instance this pre-processing may comprise decoding, decrypting and/or conditioning the data. E.g. in the latter case, the conditioning may comprise adding deliberate pseudorandom noise to the experience data. This is known to help improve the ability of a machine learning algorithm (in this case run on the accelerators 2) to form generalizations from the experience data rather than just memorize the experience data. Offloading such pre-processing to the gateway(s) 93GW advantageously relieves the host CPU 93H from such tasks.

The following teachings may apply to an arrangement such as that shown in FIG. 21 with a single host or first processor 93H, or an arrangement such as that shown in FIG. 22 with multiple processors in the host or first subsystem 93, e.g. a host CPU 93H and one or more gateways 93GW. FIGS. 21 and 22 are included for illustrative purposes and should not be construed as limiting.

As mentioned, the accelerator subsystem 300 is configured to synchronize with the host subsystem 93 according to a scheme of barrier synchronizations. This means that the processing performed by the accelerator subsystem 300 is performed over a series of steps, wherein the steps are delineated by synchronization barriers. In each step, each processor of the accelerator subsystem 300 performs some respective processing assigned to that step, e.g. by the compiler. The processing performed in the current step by the accelerator subsystem 300 is processing that it can perform without waiting for the host subsystem 93 to agree that the system can advance past the next barrier to the next step.

In embodiments, each of these steps may be a system-level BSP superstep s. E.g. see FIG. 20. That is, at the beginning of each step there is an exchange phase 50" in which the host subsystem 93 and accelerator subsystem 300 exchange data with one another, and then in that same step follows a compute phase 52" where the accelerator subsystem 300 performs processing only internally to the accelerator subsystem 300 and the host subsystem 93 performs processing only internally to the host subsystem 93. The accelerator subsystem 300 is not allowed to proceed to the next exchange phase 50" until both the subsystems 93, 300 have indicated readiness or agreed for the next barrier 90 to be passed. The accelerator subsystem indicates its readiness to sync by issuing a sync request, then pauses until it receives back a sync request. This will be described in more detail shortly.

Note however that the host 93 does not necessarily have to stop and wait for the sync request from the accelerator subsystem 300. It may sometimes stop and wait for a sync request from the accelerators 300 but doesn't have to. Since the host 93 syncs it can be said to be participating in the BSP system, but that does not mean every process on the host 93 has to stop at every sync point.

Note also: as well as computations, the system-level compute phase 52" (the compute phase from the perspective of the synchronization and interactions between the host and accelerator subsystems 93, 300) may also comprises exchanges between processors 2 internally within the accelerator subsystem 300, and/or exchanges between processors 93H, 93GW internally within the host subsystem 93.

In embodiments, each of the system-level BSP supersteps s may comprise one or more lower-level supersteps, such as accelerator subsystem supersteps p within the accelerator subsystem 300. I.e. the system-level compute phase 52" may comprise one or more lower level BSP supersteps, each comprising exchange 50' amongst the second processors 2 (e.g. accelerators) followed by compute 52' within each second processor 2. Also, the compute phase 52' from the perspective of this lower level BSP superstep may comprise one or more even lower level BSP supersteps, comprising exchange 50 amongst the tiles 4 internally to each second processor 2, followed by a compute phase 52 within each tile. The different levels of compute phase could be referred to as a system compute phase 50", processor (or accelerator) compute phase 50', and tile compute phase 50. Examples will be discussed in more detail later with reference to FIGS. 8 to 10 and 13. In embodiments, the host processor 93H, gateway(s) 93GW and/or network storage devices 303 may be allowed to communicate asynchronously over the host network 302 during the system compute phase 50'. I.e. no internal synchronization is necessarily required within the host subsystem 93.

To synchronize between the accelerator subsystem 300 and host subsystem 93, the accelerator subsystem 300 raises a synchronization request ("sync request", or sync_req) over the sync network 96. This indicates that the accelerator subsystem 300 has reached a point where it has to sync with the host subsystem before proceeding past the current barrier 90 to the next step s+1. E.g. the accelerator subsystem 300 has completed its compute phase 52" for the current BSP supersteps and there is now no processing left that it is allowed to do until it has received agreement form the host subsystem 93 to advance to the exchange phase 52" of the next BSP superstep s+1. The sync request may be sent over the sync network 96 in response to execution of a dedicated sync instruction by the accelerator subsystem 300, i.e. one of the machine code instructions defined in the instruction set of the accelerator processors 2.

In the case of multiple accelerator processors 2, the sync network 96 in the inter-processor interconnect 72 may comprise sync logic 76 configured to aggregate a local sync request from each of a group of some or all of the accelerator processors 2 (a sync group), and to raise the (globally aggregated) sync request to the host subsystem 93 on condition of receiving the local sync requests from all of the accelerator processors 2 in the sync group. The local sync requests may be sent in response to execution of an instance of the sync instruction on each of the accelerator processors 2 in the sync group. In embodiments the membership of the sync group is settable, e.g. from amongst multiple different hierarchal levels of groupings. In embodiments the sync group is a mode of the sync instruction (i.e. set by an operand of the sync instruction). This will be discussed in more detail later, e.g. in relation to FIG. 14.

In the case of multiple tiles 4 on a given accelerator processor 2, the internal interconnect 34 may comprise sync logic 36 configured to aggregate individual sync requests from some or all of the tiles 4 on the accelerator processor 2 (the participating tiles), and to raise the (locally aggregated) sync request from the accelerator processor 2 on condition of receiving the individual sync requests from each of the participating tiles 4. In embodiments each of the individual sync requests raised by the tiles 4 is the result of executing an instance of the dedicated sync instruction on the respective tile 4, e.g. by a supervisor thread running on the tile 4. This will again be discussed in more detail later.

The host processor 93H causes a synchronization acknowledgement ("sync acknowledgment", or sync_ack) to be returned to the accelerator subsystem 300, over the sync network 96, in response to the sync request from the accelerator subsystem 300 (e.g. the aggregated sync request in the case of multiple accelerator processors 2). The host processor 93H could do this by sending the sync ack directly. However, this may require the host processor 93H to be specially configured to connect to the sync network 96. It would be desirable if a general purpose processor such as a general purpose CPU could be used as the host 93H. Therefore to accommodate this, in embodiments the mechanism for the synchronization between the host and accelerator subsystems 93, 300 employs a component referred to herein as a "host sync proxy" (HSP) 98.

The host sync proxy 98 is a piece of hardware logic in the inter-processor interconnect 72 that comprises a counter 99. The counter 99 comprises register arranged to hold a number of sync credits, also referred to herein as "marks". The host subsystem 93 (e.g. host processor 93H) can write a number of credits or marks to the counter of the HSP 98. The HSP 98 is arranged to receive the sync request from the accelerator subsystem 300 (this being the globally aggregated sync request in the case of multiple accelerator processors), and to return the sync acknowledgment back to the accelerator subsystem in dependence on the number of credits currently in the counter 99. The logic of the HSP 98 is configured to operate as follows. When the HSP 98 receives a sync request from the accelerator subsystem 300 and the number of credits in the counter 99 is not exhausted, then the HSP 98 will automatically respond with a sync acknowledgement on behalf of the host subsystem 93 and automatically decrement the counter by one credit. If on the other hand the number of credits in the counter 99 is exhausted when the sync request is received from the accelerator subsystem 300, then the HSP 98 will not return the sync acknowledgement until the host subsystem 93 (e.g. host processor 93H) writes at least one more credit to the counter 99. Thus the host subsystem 93 can control whether or not the accelerator subsystem 300 advances past the next sync barrier, and when, by means of writing to the register 99. In embodiments the HSP 98 may comprise different counters 99 for different sync groups. This will be discussed in more detail later in relation to FIGS. 14 and 18.

In the case of a gateway 93GW, the HSP 98 may be implemented in the gateway 93GW itself (e.g. same chip) rather than externally in the inter-processor interconnect 72. Or equivalently, this part of the gateway chip may be considered a part of the inter-processor interconnect 72 that extends into the chip of the gateway 93GW. It will be appreciated that the distinction is only conceptual. In such embodiments where the HSP 98 is integrated into the same chip as the gateway 93GW, the gateway 93GW may connect to the accelerator side of the external interconnect 72 via a suitable interface such as an PCI, PCIe or Ethernet interface. Tunnelling via the PCI, PCIe or Ethernet protocol may be used to send the sync request and acks via such an interface. Alternatively the gateway 96GW could be provided with a dedicated, bespoke connection to the sync network 96.

Alternatively the HSP 98 could be implemented as part of the interconnect 72 external to the chip(s) of the gateway(s) 93GW. In the case where the host subsystem 93 comprises multiple gateways 93GW, the HSP 98 may comprise multiple HSP instances each comprises a respective counter 99, with each instance being arranged to receive the sync request from a respective subset of one or more of the accelerator processors 2, and each instance being configured to govern the return of the sync acknowledgements to its own respective subset of accelerators 2 in dependence on the credits in its respective counter (in the same manner as discussed previously but with respect to the respective subset of accelerators 2). In such embodiments where the HSP 98 is external to the chip of the gateway 93GW and instead incorporated on the accelerator side of the interconnect 72, then the gateway 93GW may write sync credits to the counter register 99 via a suitable interface such as a PCI, PCIe or Ethernet interface, analogous to the host CPU 93H in FIG. 21.

In either case, it may be the host CPU 93H or the respective gateway 93GW or both that have the ability to write credits to the counter(s) 99, depending on implementation.

In the case of multiple gateways 93GW, these may be able to propagate sync requests and acknowledgments between them to form sync groups larger than the accelerators 2 connected to just one single gateway 93W. The gateways 93W may be connected to one another via the host network 302, e.g. a PCI, PCIe or Ethernet network, and the sync requests and acks may be communicated between gateways 93GW by tunneling via this network and protocol. Alternatively the host network 302 could include a dedicated, bespoke connection between the gateways 32GW comprising an extension of the sync network 96 (not shown). In general the host network 302 is not limited to any particular protocol or topology.

As mentioned, in embodiments, the host processor 93H, gateway(s) 93GW and/or network storage devices 303 may be allowed to communicate asynchronously over the host network with no internal synchronization being required within the host subsystem 93. Alternatively, in some embodiments, there may be a separate system of credits (not shown) that allows the gateways 93GW to communicate autonomously with one another, the NASs 303 and/or the accelerators 2 for only a credited number of steps before requiring further involvement from the host CPU 93H. That is, when the number of these credits is not exhausted the gateways 93GW are allowed to communicate with the NAS(s) 303 and/or accelerator subsystem 300, but when these credits are exhausted then the gateways 93GW are allowed to communicate with the NAS(s) 303 and/or accelerator subsystem 300 until the host CPU 93H has written at least one more of these credits.

By whatever mechanism the synchronization between the host and accelerator subsystems 93, 300 is implemented, at some point the accelerator subsystem 300 will reach a point where its processor(s) 2 cannot continue their processing (cannot continue running their parts of the program) until they receive agreement from the host subsystem 93 that the accelerator program can proceed to the next step. I.e. a barrier 90 is reached. E.g. the accelerator subsystem 300 may need to wait for a sync ack from the HSP 98, which will not be granted until the host subsystem 93 writes to the register 99. At the same time, the host subsystem 93 may have tasks that it cannot perform until the accelerator processor 300 advances to the next step s+1, e.g. because it is dependent on some interaction with the accelerator subsystem 300. The host subsystem's resources may also be underutilized in the current steps relative to the next step s+1.

To mitigate such scenarios or similar, embodiments of the present disclosure provide a mechanism whereby a processor 2 of the accelerator subsystem 300 can send a descriptor to a processor 93H/GW of the host subsystem 93 in the current steps (which is received by the processor 93H/GW of the host subsystem 93 in the current step), informing the processor 93H/GW of the host subsystem 93 about one or more interactions that the accelerator processor 2 intends to perform in the next step s+1 (i.e. once the next barrier 90 is crossed). The descriptor may be sent via the data paths 301 of the interconnect 72, and via the host interface 97; or alternatively it is not excluded that it could be sent by another, side channel (not shown). By whatever means sent, the receiving processor 93H/GW of the host subsystem 93 can then use this descriptor to prepare for the interaction while the second subsystem 300 is still operating in the present steps, e.g. to prepare the host memory 306 such as by reserving space in memory 306 or ensuring outgoing data is generated and stored in the memory 306. This advantageously saves time since, when the accelerator subsystem 300 comes to actually request the interaction in the next step s+1, then some or all of the necessary preparation has already been performed, rather than having to begin only after being triggered by the request itself.

In embodiments such as those shown in FIG. 21, the descriptor is sent to, and used by, the host processor 93H in preparation for an interaction with that processor. In embodiments such as those shown in FIG. 22, the descriptor may be sent to, and used by, the host CPU 93H and/or one or more of the gateways 93GW in preparation for an interaction with that/those processor(s). The following may be described in terms of one of the tiles 4 in one of the accelerators 2 of the accelerator subsystem 300 interacting with the host processor or CPU 93H of the host subsystem 93 of FIG. 21 or 22. However it will be appreciated that, more generally, the teachings below may apply to any single or multi-tile processor 2 of a second processing subsystem 300 interacting with any host, gateway or other processor of a first processing subsystem 93.

Figure 23:
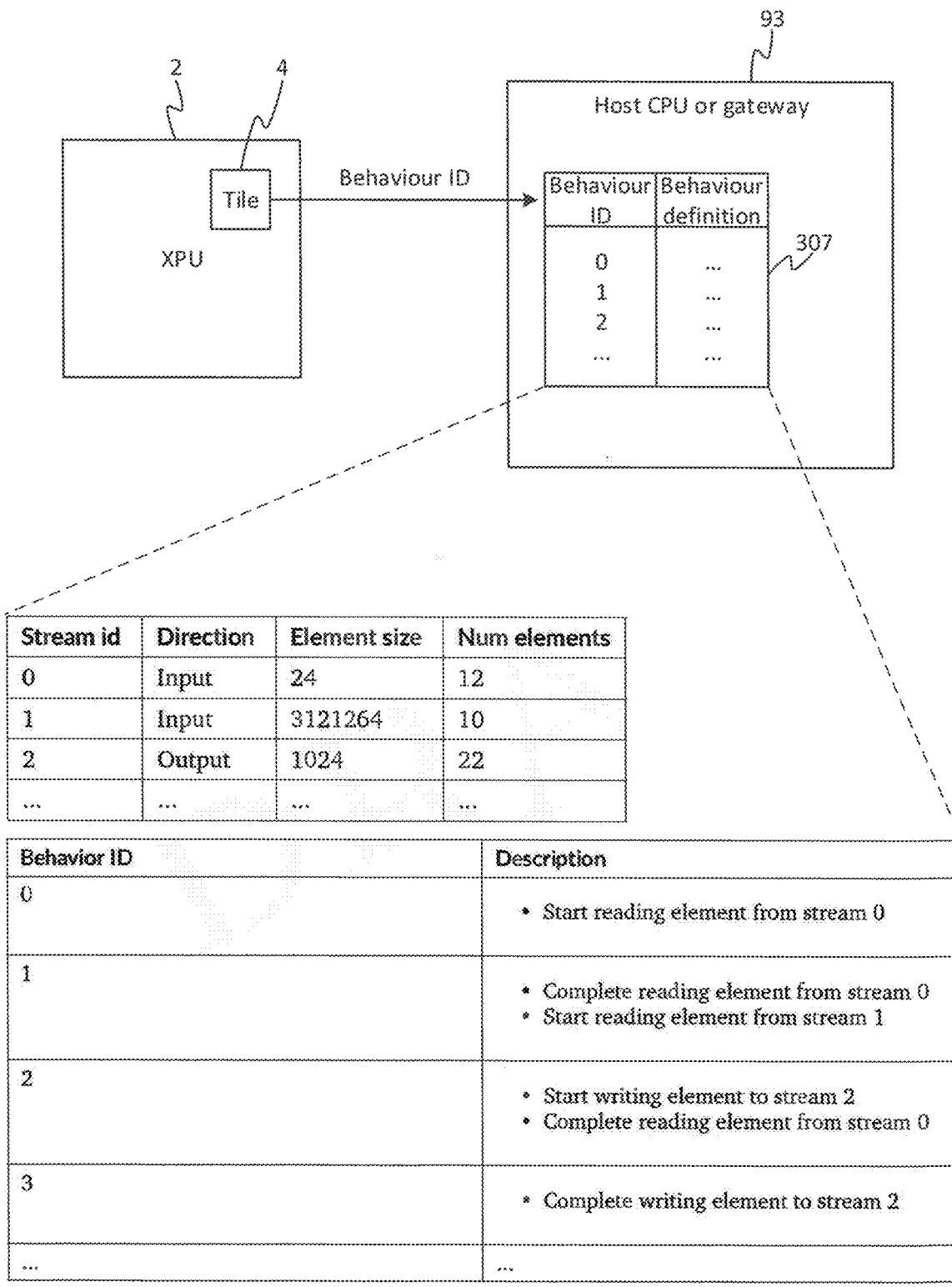
FIG. 23 is a schematic illustration of a descriptor sent from an accelerator to a host, and FIG. 24 schematically illustrates an example exchange between host and accelerator, FIG. 25 schematically illustrates another exchange between host and accelerator, and FIG. 26 schematically illustrates an exchange via a gateway.

Reference is made to FIG. 23. The descriptor specifies a value for each of a set of one or more parameters describing the intended interaction(s) for the next step s+1 (i.e. after the next synchronization barrier 90). The interaction may comprise a transfer of data between a memory 11 of the accelerator processor 2 (e.g. on one of its tiles 4) and the memory 306H of the host processor 93H (or memory 306GW of the gateway 93GW). The direction of the transfer may be incoming (input) to the memory 306 of the host processor 306H, or outgoing (output) from the memory 306 of the host 93H/GW (note therefore that the direction of the transfer is named from the perspective of the host memory 306 for the present purposes). Note also that in embodiments, the descriptor may specify multiple such interactions in one or both directions for a given step.

For each interaction, the parameters specified may for example comprise any one, more or all of: I) a direction of the transfer; II) a size (amount) of the data to be transferred in the next step e.g. in bytes; and/or III) an identifier of the item of content to which the data being transferred belongs, e.g. a stream ID identifying a stream. In embodiments the parameters may comprise an indication that the stream is to begin being streamed in the next step.

The stream to be transferred may for example comprise a sequence of images (individual still images or video frames), or an audio stream of one or more audio samples, or any other sequence of experience data (e.g. online shopping habits, etc.) which is being sent from the host subsystem 93H to the accelerator subsystem 300 in order for the accelerator subsystem 300 to use as inputs to a machine learning or machine intelligence algorithm run on the accelerator subsystem 300. For example this could be to train a neural network based on the streamed data, or to make inferences from the data based on an already-trained neural net. In an example where the stream is in the direction from accelerator subsystem 300 to host subsystem 93, the stream could comprise a stream of inferences resulting from a machine intelligence algorithm such as a trained neural net run on the accelerator subsystem 300.

In response to receiving the descriptor, software running on the host processor 93H (or gateway 93GW) performs one or more preparatory actions in the current steps to prepare for the transfer of the data in the next step s+1. This may comprise talking one or more actions to prepare the memory 306H of the host processor 93H for the transfer (or similarly for a gateway). In the case of a transfer from accelerator 2 to host 93 (e.g. one of the tiles 4 to the host processor 93H or gateway 93GW), then the preparation by the host 93H may comprise reserving space in the host memory 306H for the incoming data (or the gateway 93GW reserving space in the gateway memory, etc.). This may be based on the fact that the descriptor specifies the direction of the transfer as incoming. In embodiments, the reservation may comprise reserving a portion of the host memory 306 at least equal to the size specified by the descriptor. In the next step, when the transfer actually happens, the host processor 93H (or gateway 93GW accordingly) may then store the received portion of data as part of the data item (e.g. stream or file) specified by the descriptor.

In the case of a transfer from host 93 to accelerator 2 (e.g. the host processor 93H or gateway 93GW to one of the tiles 4), then the preparation by the host 93H may comprise any one, more or all of the following actions. It may comprise reserving space in the host memory 306H for the outgoing data (or the gateway 93GW reserving space in the gateway memory, etc.). And/or, the preparation may comprise generating the outgoing data or fetching it from the data item (e.g. stream or file) identified by the descriptor. And/or, the preparation may comprise pre-processing the outgoing data (e.g. decrypting, decoding, or preconditioning it such as to add deliberate pseudorandom noise). And/or, the preparation may comprise storing the generated or outgoing data in the host memory 306, e.g. in the reserved space in memory. This may be based on the fact that the descriptor specifies the direction of the transfer as outgoing. In embodiments, again the reservation may comprise reserving a portion of the host memory 306 at least equal to the size specified by the descriptor.

In embodiments the host memory 306 (e.g. the memory of the host processor 93H or the memory 306GW of a gateway processor 93GW) may comprise at least one first-in, first-out (FIFO) buffer 308. This may be employed for example in the case of streaming over multiple steps. For instance the FIFO 308 may comprise a circular FIFO. In the case of a FIFO 308, the reserving comprises ensuring that a suitably sized space is kept free in the FIFO, e.g. at least equal in size to the size specified by the descriptor. In embodiments the host memory comprises multiple FIFOs, e.g. an input FIFO and output FIFO. For an incoming stream the reserving may comprise reserving space in the input FIFO (incoming to the host), and for an outgoing stream the reserving may comprise reserving space in the outgoing FIFO).

Any the values of any parameters not specified by the descriptor may, in other embodiments, be defaults, or may be specified in the next step s+1 by the actual request from the accelerator 2 for the transaction.

In embodiments the descriptor takes the form of at least one behaviour ID which maps to values of the one or more parameters at the host side 93 (rather than the specified value(s) of the parameter(s) being explicitly coded into the descriptor). This is the preferred means by which the descriptor specifies the value(s) of the one or more parameters of the interaction since it reduces the signalling overhead. In this case the host subsystem 93 comprises one or more look-up tables 307, e.g. stored in the host memory 306H or another memory to which the host processor 93H has access (or similarly for the gateway processor 93GW). The one or more look-up tables 307 map each of the possible behaviour IDs to a different respective one of a plurality of predetermined behaviours. The predetermined behaviours are generated in advance by the compiler, and pre-stored in the host subsystem 93. Each behaviour comprises a different set of one or more values for the one or more parameters to be specified (each set comprising at least one unique value or a unique combination of values). Note this does not have to be achieved in a single look-up table. For instance in the example shown in FIG. 23, the look-up tables 307 comprise two look-up tables. A first of the look-up tables 307 maps the behaviour ID to an indication of: the stream ID, and whether streaming is to start or stop. A second of the look-up tables 307 maps the stream ID to an indication of: the stream direction (input or output, i.e. incoming or outgoing), and the size of the portion of data to be transferred per step (in the particular example illustrated, in terms of a number of elements per step and a size of each element in bytes, though this is not limiting). In alternative embodiments it is not excluded that all the specified values could be mapped directly to the behaviour ID in a single look-up table 307. Other arrangements are also possible.

By whatever means the look-up table(s) 307 is/are implemented, the host processor 93H (or gateway 94GW) uses the behaviour ID signalled in the received descriptor to look up the corresponding one or more values of the parameter(s) of the interaction in the look-up table(s) 307. The host processor 93H (or gateway 93GW) then performs the preparation in the current step as described previously. In embodiments the descriptor may comprise more than one behaviour ID so as to specify more than one interaction in one or both directions.

In variants, the descriptor does not (or not only) specify the interaction(s) for the next step, but rather one or more further steps s+2, s+3, . . . beyond that. I.e. the descriptor could specify value(s) of one or more parameters of an interaction that is to occur in a step s+k that is k steps ahead of the current step s (where k is a positive integer). In some embodiments k is simply always 1 by default, or in alternative embodiments k may be specified by the descriptor (either implicitly or again by means of a look-up mapped to the behaviour ID at the host side 93). In some cases the descriptor could specify interactions for the next K steps, k=1 to K (where K is an upper value of k); or more generally a range of steps k=k1 . . . k2 (where k1, K2 are positive integers and k2>k1); or even an arbitrary set of future steps k={ . . . }.

In the case where the parameters include an indication that streaming is to begin in the next step s+1, then the host 93H may assume that streaming is to continue (i.e. the interaction will be ongoing) in each subsequent step until further notice. E.g. it continues to reserve space in memory 306H for the same sized portion of the stream at each successive step s+2, 2+3, etc. "Further notice" means until another descriptor is received from the accelerator subsystem 300 indicating that streaming will be terminated in the next step after the sending of that descriptor. This means the host 93H can free the reserved memory in the step after that (two steps from receiving the descriptor indicating the termination, i.e. if termination is indicated in step s+j, then the streaming is terminated in step s+j+1, and the host 93H can free the reserved memory in step s+j+2). The termination may be an additional one of the behaviours (note therefore that not all behaviours are behaviours that the host 93H prepares in advance for).

Figure 24:
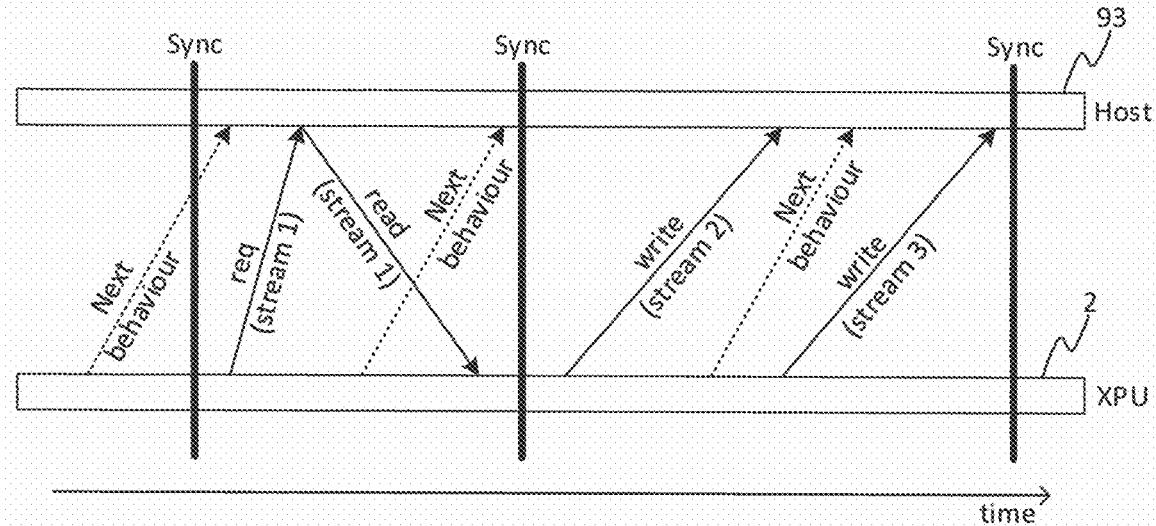
Figure 25:
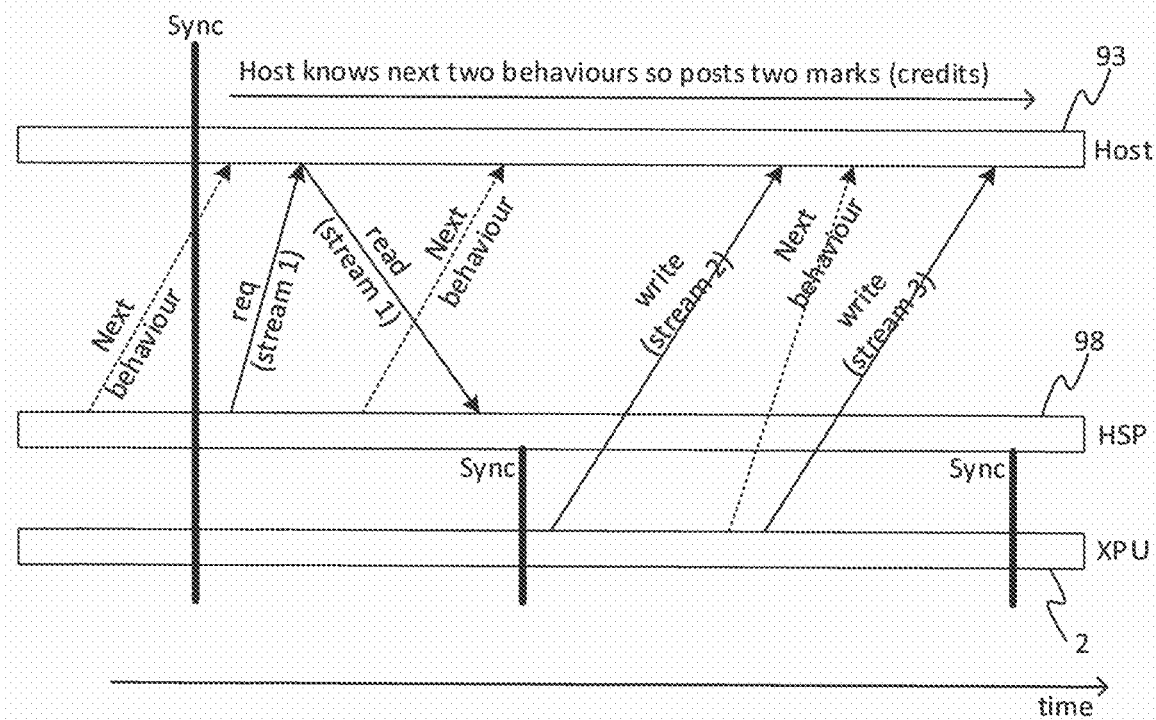
Figure 26:
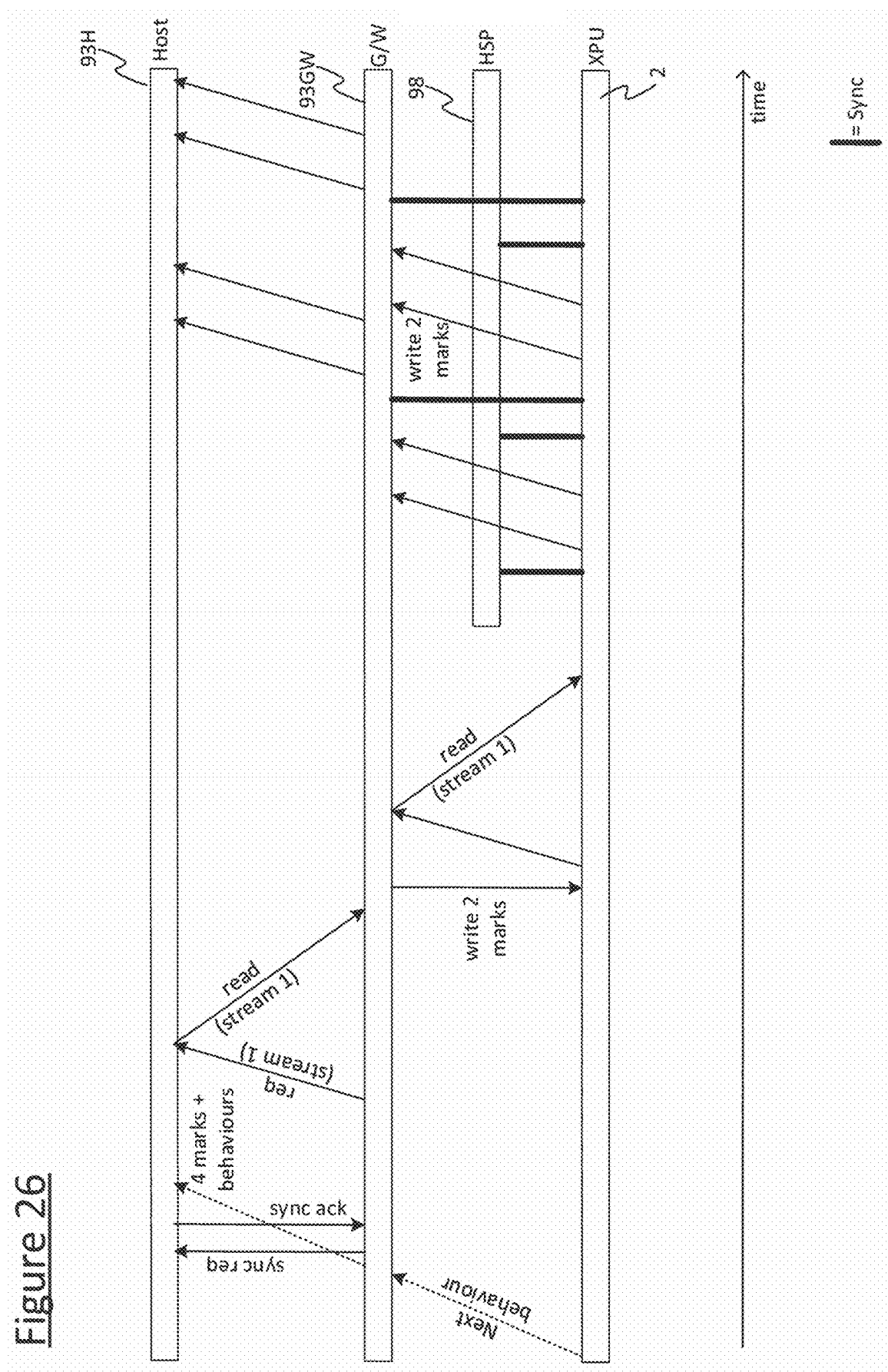

Further example details are described with reference to FIGS. 24 to 26. When the accelerator 2 (e.g. an IPU) runs a program it can read/write data from external sources. The following describes an example of how the host processor 93H (and/or any intermediate gateways 93GW) can interact with this data transfer, and gives an overview of the interactions between the various actors. It will be exemplified in terms of the host processor 93H but the same teachings may alternatively or additionally apply to a gateway 93GW.

Regarding streams and IPU directed data movement: when a program runs on the IPU 2, there are a known, fixed number of data streams that it may access during execution. Each stream is marked as either input or output and each stream has a fixed element size which is the number of bytes transferred in each step.

A step in this instance is a period of time that the IPU 2 executes for that has externally visible effect. This is not necessarily the same as the BSP step of the IPU 2 since some BSP steps have no externally visible behaviour. During each step the IPU 2 will read or write to a subset of the streams. This may be called the behaviour of a step. During execution there is a fixed number of behaviours.

On program load, the host 93H can store two meta-information tables about the program. An example of the list of streams is given in the top look-up table 307 in FIG. 23, and an example of the list of behaviours is given in the bottom look-up table in FIG. 23.

An IPU program execution consists of a series of steps. During each step IPUs will execute one of the communication behaviours. At the end of each step the IPU 2 synchronizes with the host 93H to signal that the behaviour is completed. The host 93H can then act upon this synchronization.

The IPU 2 is in control of which behaviour it executes. This is totally under the remit of the programmer. For example, the IPU 2 could, at each step, choose between the possible I/O behaviours in dependence on a random number generator inside the IPU, an external stimulus, or a non-deterministic calculation.

With regard to the host interaction, at each sync point the host 93H will: firstly, act on any stream writes to host memory 306H that have been completed in the previous step, and secondly, make sure data is provided for any stream reads that are going to start in the next step. This process is managed by the host runtime whilst the IPU 2 is executing. To complete these actions the host 93H will require to know which behaviour was executed in the previous step and which behaviour will be executed in the next step.

There are two implementation strategies for this. One is to have the host 93H "mirror" the control program of the IPU 2 so it knows what is coming. The second is, at each step, have the IPU 2 transfer its next step behaviour to the host. The first option will require extra communication between the device 2 and the host 93H so the host can mimic the control flow decisions made by the IPU 2. Therefore embodiments of the present disclosure instead use the second option (the first being an optional optimization).

IPU informed behaviours work by the IPU 2 transferring the behaviour ID of the next step to a fixed location in host memory 306H each step. See FIG. 24.

This memory location acts as a mailbox. At each sync point, the host 93H can perform the following steps:
1. Receive sync request from the device 2
2. Poll on the memory location until it arrives to determine the next step behaviour.
3. Act upon data written in the previous step.
4. Prepare read/write buffers 308 for the next step.
5. Clear the behaviour memory location.
6. Release the sync to the device 2.

Note that the IPU 2 starts this process with a behaviour transmission and sync before any data transfer is performed.

The following now describes an optional technique for optimizing away sync latency. In a fully synchronous mechanism, then at every step, the device 2 syncs with the host 93. However, this synchronization has a large latency cost. The interaction can be optimized to be performed in an asynchronous manner during the execution of the program. This is enabled by the host sync proxy (HSP) hardware 98. By using this functionality, if the host 93H knows what several behaviours will be ahead of time it can eliminate the need for some syncs. The host sync proxy 98 contains a piece of state—the ipu_mark_count (i.e. the number of credits in the counter 99). This acts as a semaphore. The host 93H can increment the mark count and the host sync proxy 98 can decrement it. If the mark count is 0 the IPU 2 cannot progress past a sync step. Each time the IPU 2 goes past a sync step the mark count is decremented. The host and proxy can then interact according to the following set of asynchronous actions:

| Pre-condition | Action |
| --- | --- |
| Host does not know next behaviour | Host will:<br>Clear behaviour memory location<br>Increment ipu_mark_count by 1 |
| Host knows next K behaviours | Host will:<br>Prepare read/write buffers for K steps<br>Increment ipu_mark_count by K |
| Host observes decrease in ipu_mark_count by J. | Host will:<br>If ipu_mark_count is 0 and next behaviour is unknown. Read next behaviour ID transmitted by IPU.<br>Handle data written to host during the J steps by IPU. |
| IPU completes step | Host sync proxy will:<br>Decrement ipu_mark_count.<br>Block IPU until ipu_mark_count is nonzero.<br>Allow IPU to continue. |

This allows the host 93H to move between asychronous and sychronous operation depending on whether it has knowledge of upcoming behaviours or not. See FIG. 25.

How the host 93H knows upcoming behaviours may involve extra information being provided by the compilation process to the host runtime.

Regarding the implementing of a gateway, a gateway 93GW sits between the host CPU 93H and device 2 during execution and has its own memory 306GW. On the gateway's memory 306GW, local buffers will "mirror" buffers 308 on the host CPU 93H. During execution the IPU 2 will read and write to streams in the gateway local memory 306GW. To act as a proxy between host CPU 93H and device 2 and allow asynchronous operation, the gateway may have its own state (the gw_mark_count) and acts between the host CPU 93H and gateway 93GW in the same way as between the IPU2 and host CPU 93H. The host sync proxy 98 acts between the gateway 93GW and the IPU 2. The gateway can then work as an intermediary by extending the action table from the previous section:

| Pre-condition | Action |
| --- | --- |
| Host does not know next behaviour | Host will:<br>Clear behaviour memory location<br>Post 1 mark to gateway. |
| Host knows next K behaviours | Host will:<br>Prepare read/write buffers for K steps<br>Post K marks and K behaviours to gateway. |
| Host observes decrease in ipu_mark_count by J. | Host will:<br>If gw_mark_count is 0 and J is 1 and next behaviour is unknown. Read next behaviour ID transmitted by gateway.<br>Handle data written to host during the J steps by gateway. |
| Gateway receives K marks from host with K future behaviours | Gateway will:<br>Start transferring buffers from host to gateway for next K steps<br>Increment gw_mark_count by K. |
| Gateway receives mark from host with no known future behaviour. | Gateway will:<br>Increment gw_mark_count by 1. |
| Gateway does not know next behaviour and gw_mark_count > 0. | Gateway will:<br>Clear behaviour memory location<br>Increment ipu_mark_count by 1 |
| Gateway knows K behaviours and gw_mark_count >= n. | Gateway will:<br>Complete copying data from host to gateway that will be read in the next K steps.<br>Prepare write buffers for next K steps.<br>Increment ipu_mark_count by K |
| Gateway observes decrease in ipu_mark_count by J. | Gateway will:<br>If ipu_mark_count is 0 and next behaviour is unknown. Read next behaviour ID transmitted by IPU.<br>Transmit behaviour ID to host.<br>Copy data written to gateway during the J steps by IPU to the host.<br>Decrement gw_mark_count by J. |
| IPU completes step | Host sync proxy will:<br>Decrement ipu_mark_count.<br>Block IPU until ipu_mark_count is nonzero.<br>Allow IPU to continue. |

In this scheme, the gateway 93GW can perform asynchronous data transfer between host CPU 93H and gateway 93GW, and between gateway 93GW and the device 2, without requiring knowledge of the control program on the IPU 2. It solely needs to act on the future behaviour descriptions given to it by the host CPU 93H. FIG. 26 shows a timeline of the gateway moving from synchronous to asynchronous operation.

Between the host CPU 93H and the gateway 93GW an interface may be required for the following:

Providing the gateway with the stream and behaviour table on initialization.

Providing information on the mirroring of host buffers and gateway buffers for each stream to the gateway.

Allowing the host to increment the gateway mark count, possibly with extra information on known future behaviours.

Querying the gateway on the current value of the gateway mark count.

Note again that in some cases, there may be multiple transfers that happen in parallel during a single step. For example the system might simultaneously transfer data from the device 2 to the host 93 and from the host 93 to the device 2. In this case the lookup table indexed by the behaviour ID contains information about all the transfers (e.g. the direction of transfer, the size, etc) for that step.

By way of illustration, the following now describes further optional details for implementing the features of the systems of any of FIGS. 21 to 26 or similar.

Figure 1:
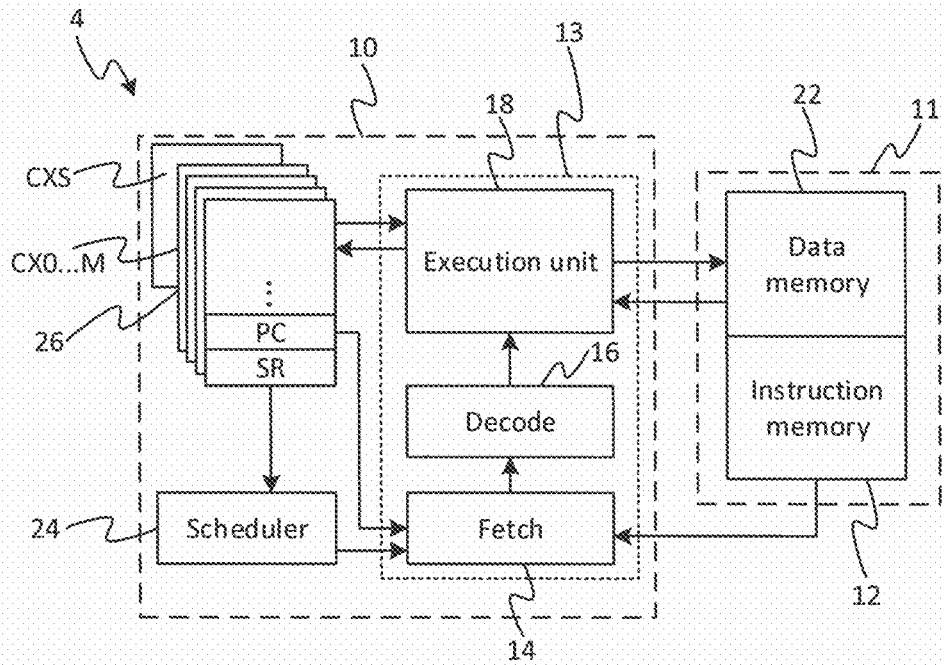
FIG. 1 is a schematic block diagram of a multi-threaded processing unit.

FIG. 1 illustrates an example of a processor module 4 in accordance with embodiments of the present disclosure. For instance the processor module 4 may be one tile of an array of like processor tiles on a same chip, or may be implemented as a stand-alone processor on its own chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 2:
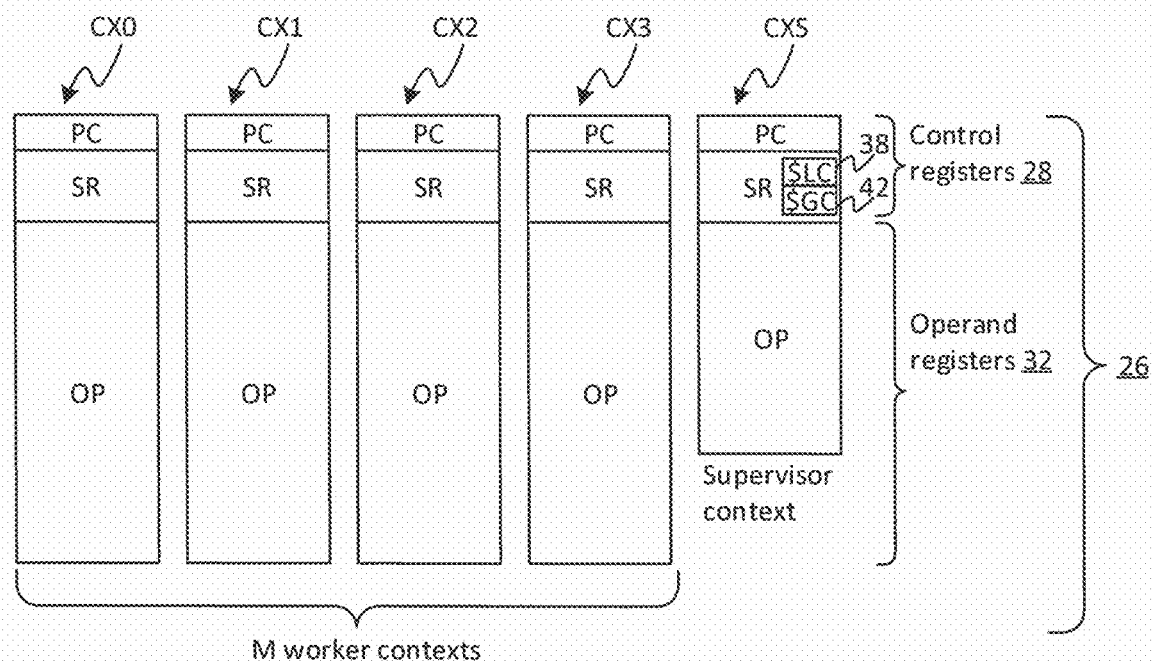
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

In embodiments, the arrangement comprises one worker context register file CX0 . . . CX(M−1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers. Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processor module 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution unit is capable of executing concurrently, i.e. the number of concurrent slots the execution unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
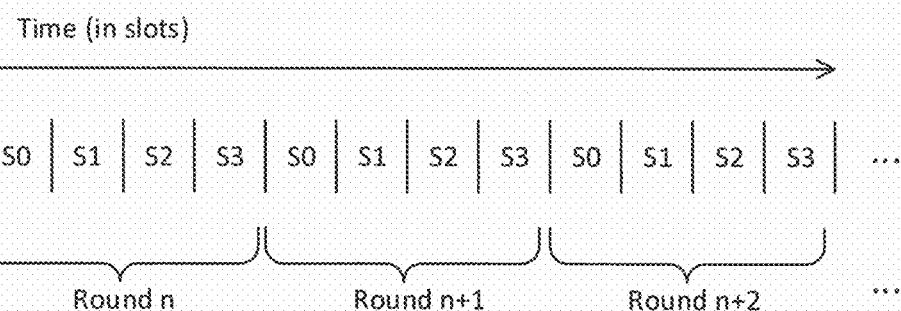
FIG. 3 schematically illustrates a scheme of interleaved time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

Whatever the number of time slots the round-robin scheme is divided into, then according to present disclosure, the processing unit 10 comprises one more context register file 26 than there are time slots, i.e. it supports one more context than the number of interleaved timeslots it is capable of barrel-threading.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of a plurality of "worker threads" currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities. For example, the supervisor thread may be responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

Note of course that four time slots is just an example, and generally in other embodiments there may be other numbers, such that if there are a maximum of M time slots 0 . . . M−1 per round, the processor module 4 comprises M+1 contexts CX . . . CX(M−1) & CXS, i.e. one for each worker thread that can be interleaved at any given time and an extra context for the supervisor. E.g. in one exemplary implementation there are six timeslots and seven contexts.

Figure 4:
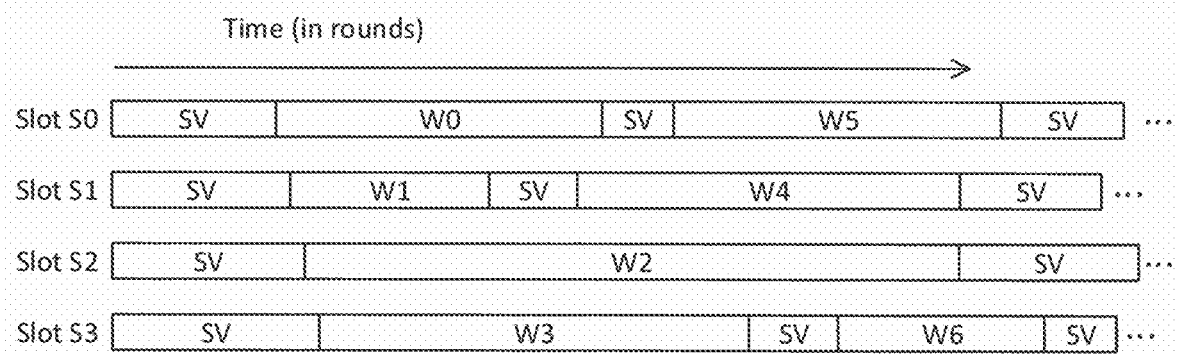
FIG. 4 schematically illustrates a supervisor thread and plurality of worker threads.

Referring to FIG. 4, the supervisor thread SV does not have its own time slot per se in the scheme of interleaved time slots. Nor do the workers as allocation of slots to worker threads is flexibly defined. Rather, each time slot has its own dedicated context register file (CX0 . . . CXM−1) for storing worker context, which is used by the worker when the slot is allocated to the worker, but not used when the slot is allocated to the supervisor. When a given slot is allocated to the supervisor, that slot instead uses the context register file CXS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM−1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 4. This is achieved by the supervisor thread executing a run instruction, called "RUN" by way of example herein. In embodiments this instruction takes two operands: an address of a worker thread in the instruction memory 12 and an address of some data for that worker thread in the data memory 22:
RUN task_addr, data_addr The worker threads are portions of code that can be run concurrently with one another, each representing one or more respective computation tasks to be performed. The data address may specify some data to be acted upon by the worker thread. Alternatively, the run instruction may take only a single operand specifying the address of the worker thread, and the data address could be included in the code of the worker thread; or in another example the single operand could point to a data structure specifying the addresses of the worker thread and data. As mentioned, in embodiments at least some of the workers may take the form of codelets, i.e. atomic units of concurrently executable code. Alternatively or additionally, some of the workers need not be codelets and may instead be able to communicate with one another.

The run instruction ("RUN") acts on the scheduler 24 so as to relinquish the current time slot, in which this instruction is itself executed, to the worker thread specified by the operand. Note that it is implicit in the run instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the run instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . Wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the run instruction ("RUN") to allocate this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M−1)).

Further, in some embodiments the RUN and/or RUNALL instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as a floating point rounding mode (e.g. round to nearest or round to zero) and/or an overflow mode (e.g. saturate or use a separate value representing infinity). The copied status or mode then controls the worker in question to operate in accordance with the copied status or mode. In embodiments, the worker can later overwrite this in its own status register (but cannot change the supervisor's status). In further alternative or additional embodiments, the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Each of the currently allocated worker threads W0 . . . W3 proceeds to perform the one or more computation tasks defined in the code specified by the respective run instruction. At the end of this, the respective worker thread then hands the time slot in which it is running back to the supervisor thread. This is achieved by executing an exit instruction ("EXIT").

The EXIT instruction takes at least one operand and preferably only a single operand, exit_state (e.g. a binary value), to be used for any purpose desired by the programmer to indicate a state of the respective codelet upon ending (e.g. to indicate whether a certain condition was met):
EXIT exit_state The EXIT instruction acts on the scheduler 24 so that the time slot in which it is executed is returned back to the supervisor thread. The supervisor thread can then perform one or more subsequent supervisor tasks (e.g. barrier synchronization and/or exchange of data with external resources such as other tiles), and/or continue to execute another run instruction to allocate a new worker thread (W4, etc.) to the slot in question. Note again therefore that the total number of threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be assigned to which of the interleaved time slots S0 . . . SM in the round robin schedule of the scheduler 24.

Furthermore, in embodiments the EXIT instruction may have a further special function, namely to cause the exit state specified in the operand of the EXIT instruction to be automatically aggregated (by dedicated hardware logic 37) with the exit states of a plurality of other worker threads being run through the same pipeline 13 of the same processor module 4 (e.g. same tile). Thus an extra, implicit facility is included in the instruction for terminating a worker thread.

Figure 5:
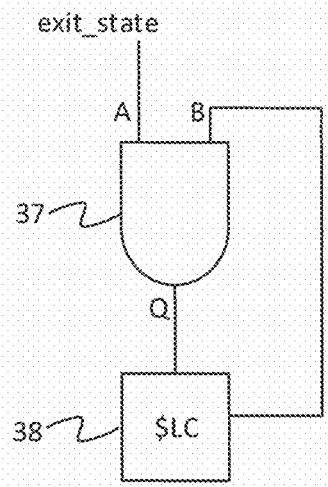
FIG. 5 is a schematic diagram of logic for aggregating exit states of multiple threads, FIG. 6 schematically illustrates synchronization amongst worker threads on the same tile.

An example circuit for achieving this is shown in FIG. 5. In this example, the exit states of the individual threads and the aggregated exit state each take the form of a single bit, i.e. 0 or 1. The processor module 4 comprises a "local consensus" ($LC) register 38 for storing the aggregated exit state of that processor module 4. In embodiments this local consensus register $LC 38 is one of the supervisor's status registers in the supervisor's context register file CXS. The logic for performing the aggregation may comprise an AND gate 37 arranged to perform a logical AND of (A) the exit state specified in the EXIT instructions' operand and (B) the current value in the local consensus register ($LC) 38, and to output the result (Q) back into the local consensus register $LC 38 as a new value of the local aggregate. However it will be appreciated that FIG. 5 is just one example and other forms of automated aggregation could be implemented, such as a Boolean OR (equivalent if the interpretation of 0 and 1 are inverted), or more complex circuitry for aggregating non-Booleans exit states. E.g. in embodiments the exit states may be trinary states.

At a suitable synchronization point in the program, the value stored in the local consensus register ($LC) 38 is initially reset to a value of 1. I.e. any threads exiting after this point will contribute to the locally aggregated exit state $LC until next reset. Every time an EXIT instruction is executed its exit state is aggregated with those that have gone before (since last reset). Thus by means of the arrangement shown in FIG. 5, the logic keeps a running aggregate of the exit states of any worker threads which have terminated by means of an EXIT instruction since the last time the local consensus register ($LC) 38 was reset. The reset of the aggregate in the local consensus register ($LC) 38 may be performed by the supervisor SV performing a PUT to the register address of the local consensus register ($LC) 38 using one or more general purpose instructions. Alternatively it is not excluded that the reset could be performed by an automated mechanism, for example triggered by executing the SYNC instruction described later herein.

The exit states can be used to represent whatever the programmer wishes, but one particularly envisaged example is to use an exit state of 1 to indicate that the respective worker thread has exited in a "successful" or "true" state, whilst an exit state of 0 indicates the respective worker thread exited in an "unsuccessful" or "false" state. E.g. the exit state of a thread may represent whether the error(s) in the one or more parameters of a respective node in the graph of a machine intelligence algorithm has/have fallen within an acceptable level according to a predetermined metric; or in a non-Boolean case, a degree of confidence in the result of the thread.

Whatever meaning is given by the programmer to the exit states, the supervisor thread SV can then get the aggregated value from the local consensus register ($LC) 38 to determine the aggregated exit state of all the worker threads that exited since it was last reset, for example at the last synchronization point, e.g. to determine whether or not all the workers exited in a successful or true state. In dependence on this aggregated value, the supervisor thread may then make a decision in accordance with the programmer's design; such as to report to the host processor 93H, or perform another iteration of the part of the program comprising the same worker threads.

Figure 6:
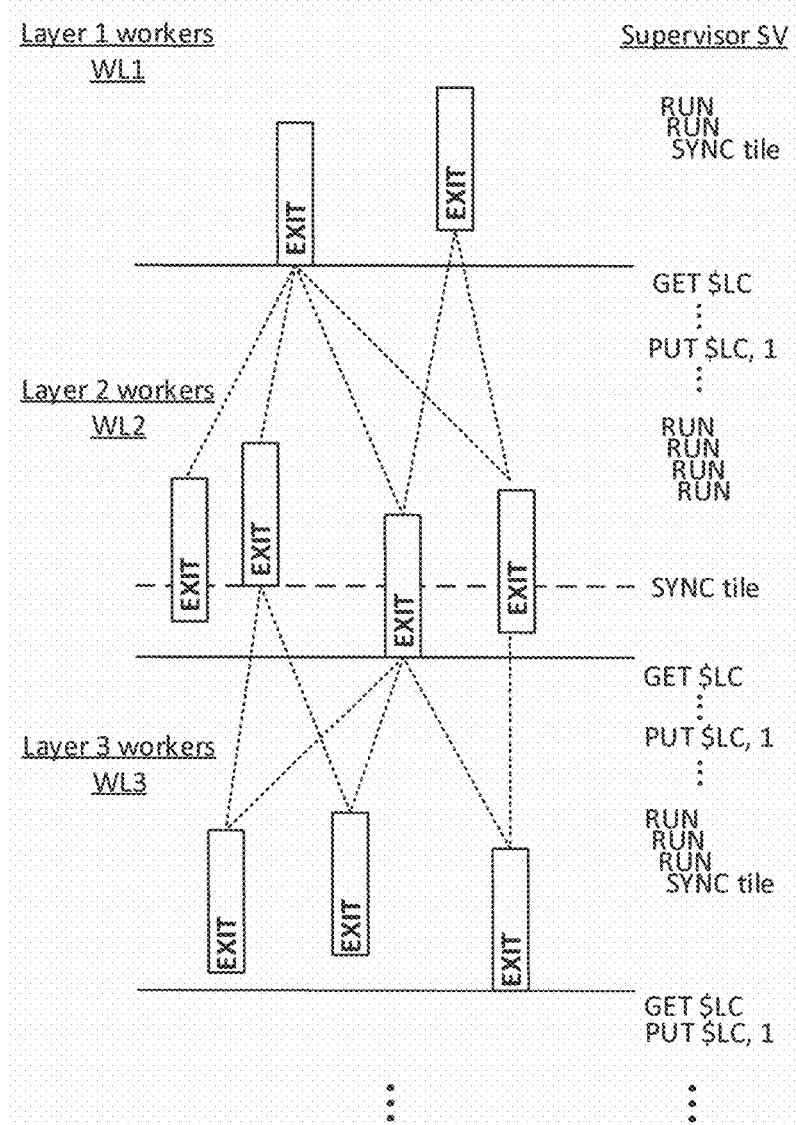

Referring to FIG. 6, in embodiments a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, as the supervisor as part of which the SYNC is executed on (i.e. only threads through the same pipeline 13 of the same barrel-threaded processing unit 10); or whether instead it is to apply across multiple tiles or even across multiple chips.

SYNC mode //mode ∈{tile, chip, zone_1, zone_2}

This will be discussed in more detail later but for the purposes of FIG. 6 a local SYNC will be assumed ("SYNC tile", i.e. a synchronization within a single tile).

The workers do not need to be identified as operands of the SYNC instruction, as it is implicit that the supervisor SV is then caused to automatically wait until none of the time slots S0, S1, . . . of the barrel-threaded processing unit 10 is occupied by a worker. As shown in FIG. 6, once each of a current batch of workers WLn have all been launched by the supervisor, the supervisor then executes a SYNC instruction. If the supervisor SV launches workers W in all the slots S0 . . . 3 of the barrel-threaded processing unit 10 (all four in the example illustrated, but that is just one example implementation), then the SYNC will be executed by the supervisor once the first of the current batch of worker threads WLn has exited, thus handing back control of at least one slot to the supervisor SV. Otherwise if the workers do not take up all of the slots, the SYNC will simply be executed immediately after the last thread of the current batch WLn has been launched. Either way, the SYNC causes the supervisor SV to wait for all others of the current batch of workers WLn−1 to execute an EXIT before the supervisor can proceed. Only after this the supervisor executes a GET instruction to get the content of the local consensus register ($LC) 38. This waiting by the supervisor thread is imposed in hardware once the SYNC has been executed. I.e. in response to the opcode of the SYNC instruction, the logic in the execution unit (EXU) of the execution stage 18 causes the fetch stage 14 and scheduler 24 to pause from issuing instructions of the supervisor thread until all outstanding worker threads have executed an EXIT instruction. At some point after getting the value of the local consensus register ($LC) 38 (optionally with some other supervisor code in between), the supervisor executes a PUT instruction to reset the local consensus register ($LC) 38 (in the illustrated example to 1).

As also illustrated in FIG. 6, the SYNC instruction may also be used to place synchronization barriers between different interdependent layers WL1, WL2, WL3, ... of worker threads, where one or more threads in each successive layer is dependent on data output by one or more worker threads in its preceding layer. The local SYNC executed by the supervisor thread ensures that none of the worker threads in the next layer WLn+1 executes until all the worker threads in the immediately preceding layer WLn have exited (by executing an EXIT instruction).

As mentioned, in embodiments the processor module 4 may be implemented as one of an array of interconnected tiles forming a multi-tile processor, wherein each of tile may be configured as described above in relation to FIGS. 1 to 6.

Figure 7:
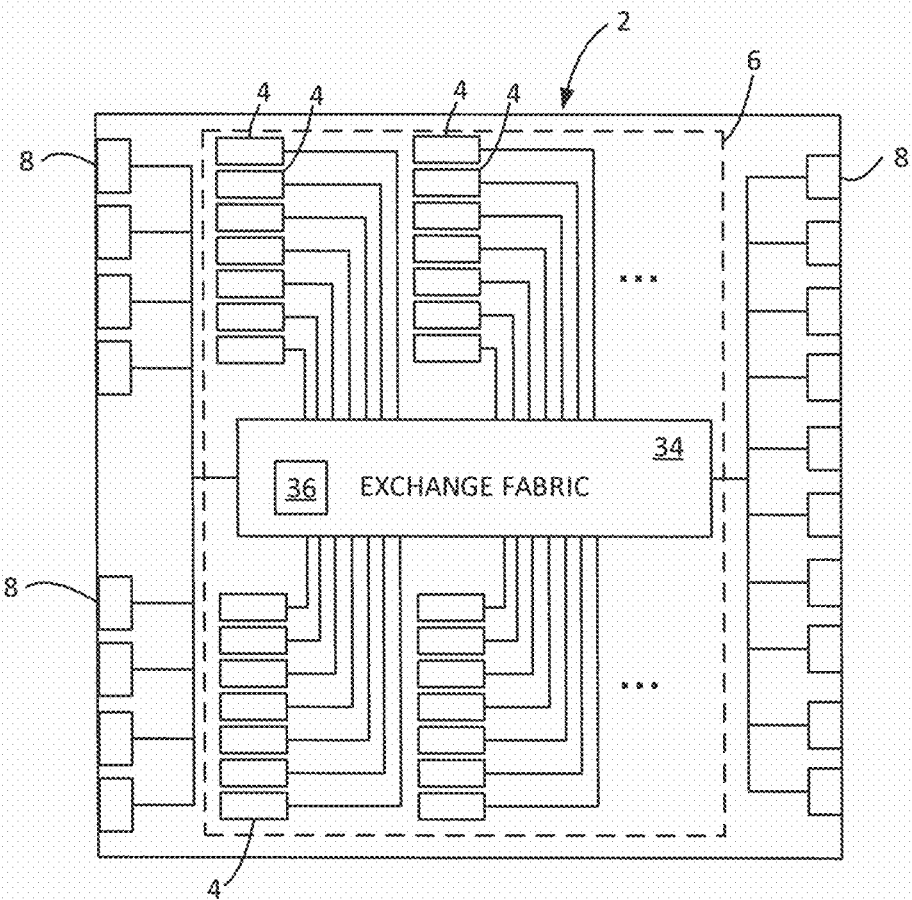
FIG. 7 is a schematic block diagram of a processor chip comprising multiple tiles.

This is illustrated further in FIG. 7 which shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 comprises a respective instance of the barrel-threaded processing unit 10 and memory 11, each arranged as described above in relation to FIGS. 1 to 6. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

In embodiments each chip 2 also comprises one or more external links 8, enabling the chip-2 to be connected to one or more other, external processors on different chips (e.g. one or more other instances of the same chip 2). These external links 8 may comprise any one or more of: one or more chip-to-host links for connecting the chip 2 to a host processor, and/or one or more chip-to-chip links for connecting together with one or more other instances of the chip 2 on the same IC package or card, or on different cards. In one example arrangement, the chip 2 receives work from a host processor (not shown) which is connected to the chip via one of the chip-to-host links in the form of input data to be processed by the chip 2. Multiple instances of the chip 2 can be connected together into cards by chip-to-chip links. Thus a host may access a computer which is architected as a single chip processor 2 or as multiple single chip processors 2 possibly arranged on multiple interconnected cards, depending on the workload required for the host application.

The interconnect 34 is configured to enable the different processor tiles 4 in the array 6 to communicate with one another on-chip 2. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

Figure 8:
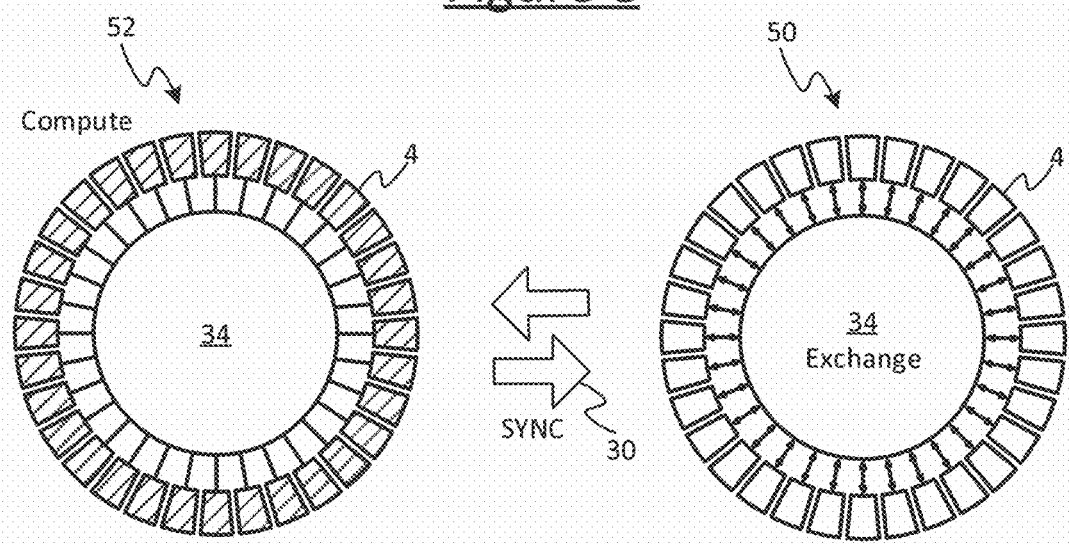
FIG. 8 is a schematic illustration of a bulk synchronous parallel (BSP) computing model.
Figure 9:
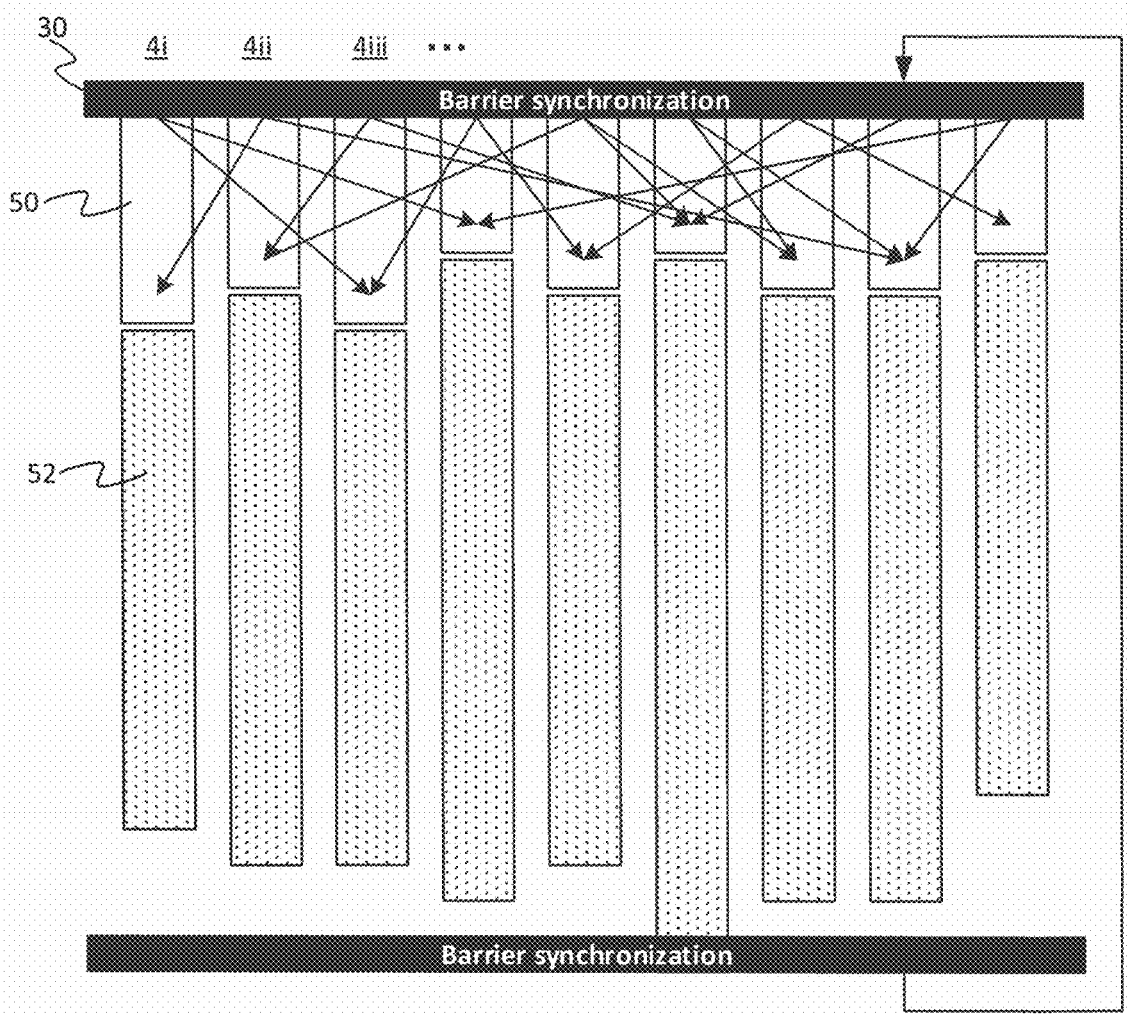
FIG. 9 is another schematic illustration of a BSP model.

This may be achieved by implementing a bulk synchronous parallel (BSP) exchange scheme, as illustrated schematically in FIGS. 8 and 9.

According to one version of BSP, each tile 4 performs a compute phase 52 and an exchange phase 50 in an alternating cycle, separated from one to the other by a barrier synchronization 30 between tiles. In the case illustrated a barrier synchronization is placed between each compute phase 52 and the following exchange phase 50. During the compute phase 52 each tile 4 performs one or more computation tasks locally on-tile, but does not communicate any results of these computations with any others of the tiles 4. In the exchange phase 50 each tile 4 is allowed to exchange one or more results of the computations from the preceding compute phase to and/or from one or more others of the tiles in the group, but does not perform any new computations until it has received from other tiles 4 any data on which its task(s) has/have dependency. Neither does it send to any other tile any data except that computed in the preceding compute phase. It is not excluded that other operations such as internal control-related operations may be performed in the exchange phase. In embodiments the exchange phase 50 does not include any non-time-deterministic computations, but a small number of time-deterministic computations may optionally be allowed during the exchange phase 50. Note also that a tile 4 performing computation may be allowed during the compute phase 52 to communicate with other external system resources external to the array of tiles 4 being synchronized—e.g. a network card, disk drive, or field programmable gate array (FPGA)—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phases 52 into the exchange phase 50, or the juncture transitioning from the exchange phases 50 into the compute phase 52, or both. That is to say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. In all three variants it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same chip 2 or different chips could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 9 illustrates the BSP principle as implemented amongst a group 4i, 4ii, 4iii of some or all of the tiles in the array 6, in the case which imposes: (a) a barrier synchronization from compute phase 52 to exchange phase 50 (see above). Note that in this arrangement, some tiles 4 are allowed to begin computing 52 whilst some others are still exchanging.

According to embodiments disclosed herein, this type of BSP may be facilitated by incorporating additional, special, dedicated functionality into a machine code instruction for performing barrier synchronization, i.e. the SYNC instruction.

In embodiments, the SYNC function takes this functionality when qualified by an inter-tile mode as an operand, e.g. the on-chip mode: SYNC chip.

Figure 10:
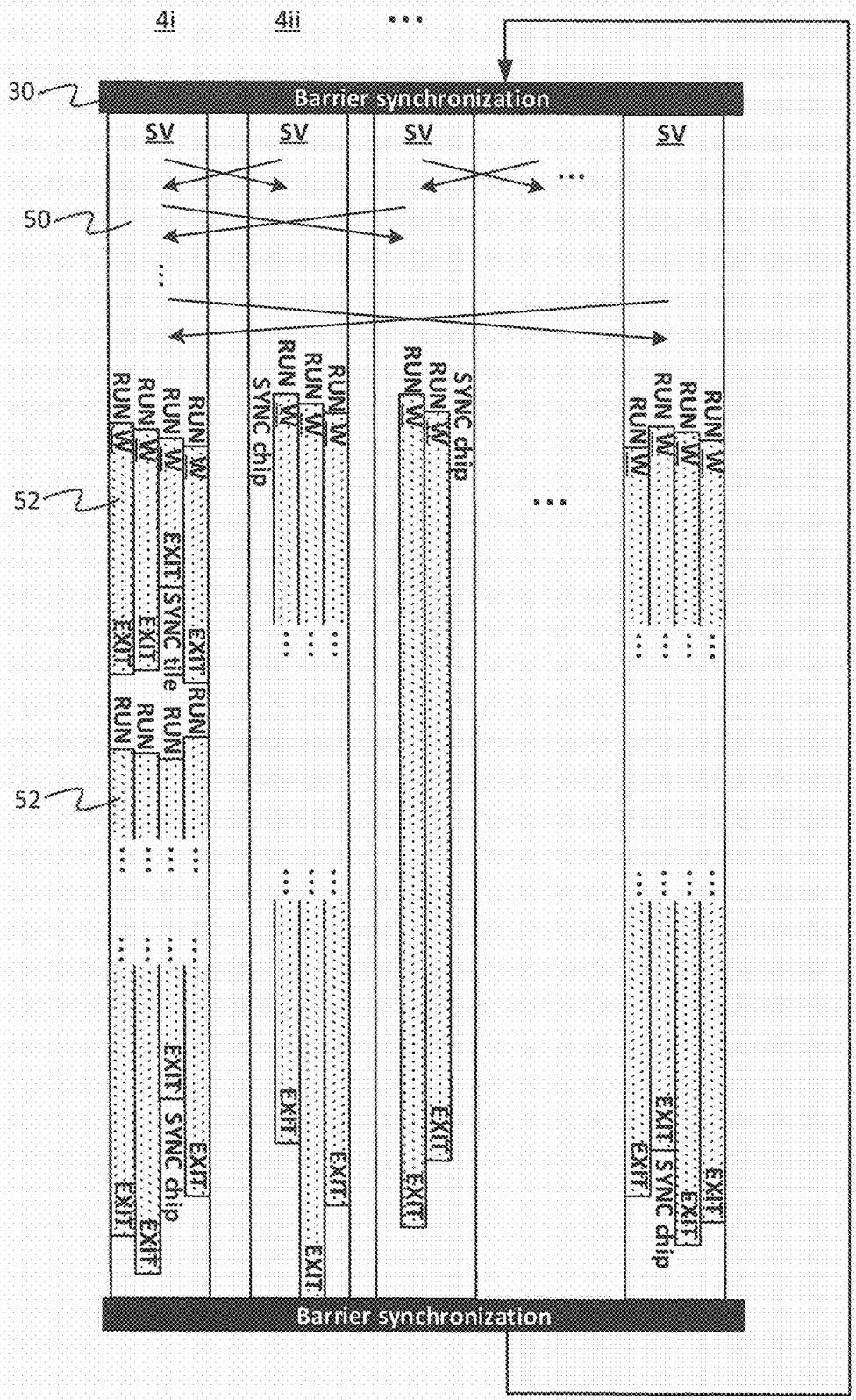
FIG. 10 is a schematic illustration of BSP between multi-threaded processing units.

This is illustrated schematically in FIG. 10. In the case where each tile 4 comprises a multi-threaded processing unit 10, then each tile's compute phase 52 may in fact comprise tasks performed by multiple worker threads W on the same tile 4 (and a given compute phase 52 on a given tile 4 may comprise one or more layers WL of worker threads, which in the case of multiple layers may be separated by internal barrier synchronizations using the SYNC instruction with the local on-tile mode as an operand, as described previously). Once the supervisor thread SV on a given tile 4 has launched the last worker thread in the current BSP superstep, the supervisor on that tile 4 then executes a SYNC instruction with the inter-tile mode set as the operand: SYNC chip. If the supervisor is to launch (RUN) worker threads in all the slots of its respective processing unit 10, the "SYNC chip" is executed as soon as the first slot that is no longer needed to RUN any more workers in the current BSP superstep is handed back to the supervisor. E.g. this may occur after the first thread to EXIT in the last layer WL, or simply after the first worker thread to EXIT if there is only a single layer.

Otherwise if not all the slots are to be used for running workers in the current BSP superstep, the "SYNC chip" can be executed as soon as the last worker that needs to be RUN in the current BSP superstep has been launched. This may occur once all the workers in the last layer have been RUN, or simply once all the worker threads have been RUN if there is only one layer.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep. I.e. after all tiles 4 on the chip 2 have passed the barrier, the cross-tile program as a whole can progress to the next exchange phase 50.

Figure 11:
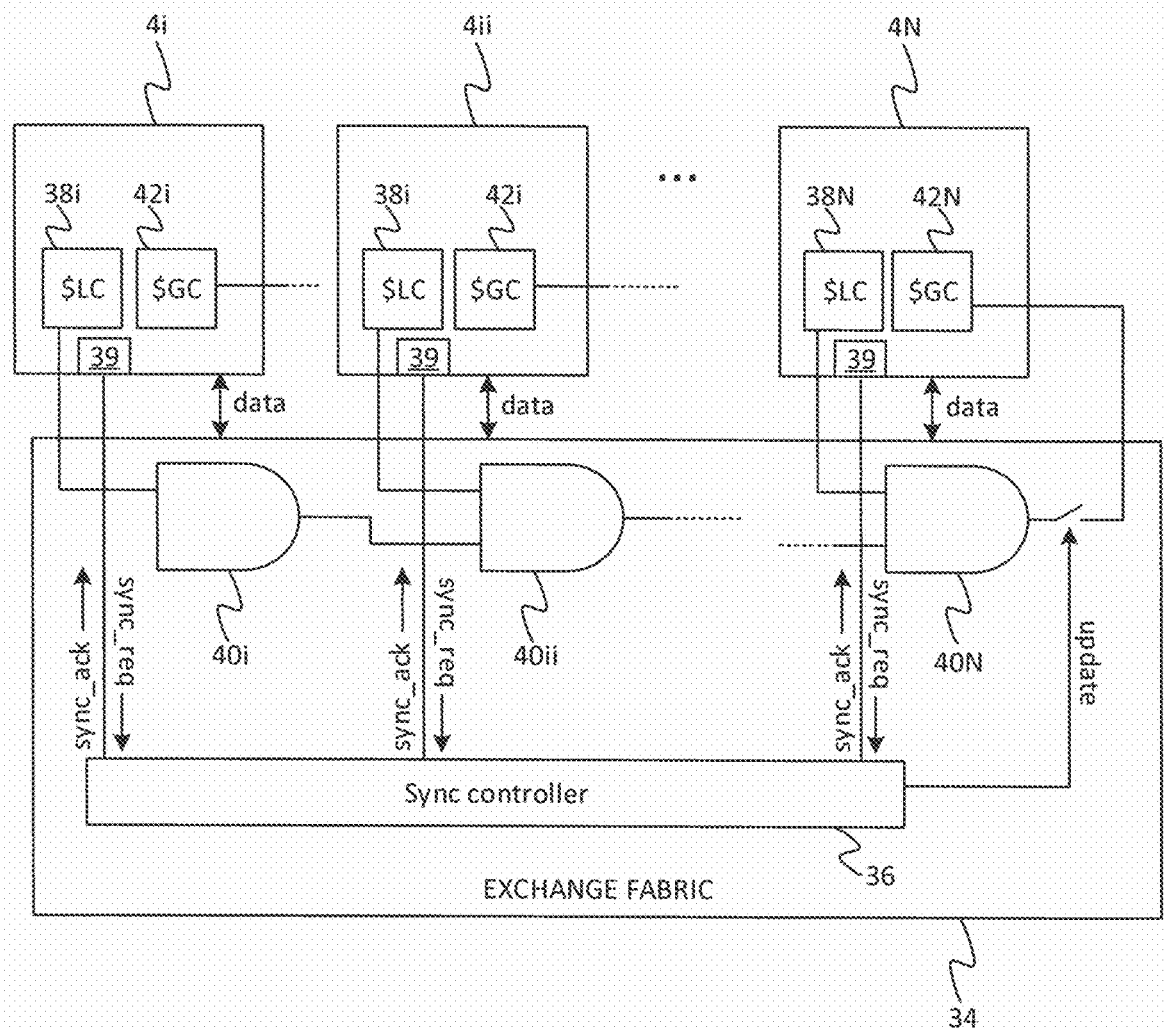
FIG. 11 is a schematic block diagram of an interconnect system.

FIG. 11 gives a schematic diagram illustrating the logic trigged by a "SYNC chip" according to embodiments disclosed herein.

Once the supervisor has launched (RUN) all of the threads it intends to in the current compute phase 52, it then executes a SYNC instruction with the on-chip, inter-tile operand: SYNC chip. This triggers the following functionality to be triggered in dedicated synchronization logic 39 on the tile 4, and in a synchronization controller 36 implemented in the hardware interconnect 34. This functionality of both the on-tile sync logic 39 and the synchronization controller 36 in the interconnect 34 is implemented in dedicated hardware circuitry such that, once the SYNC chip is executed, the rest of the functionality proceeds without further instructions being executed to do so.

Firstly, the on-tile sync logic 39 causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic 39 automatically sends a synchronization request "sync_req" to the synchronization controller 36 in the interconnect 34. The local tile 4 then continues to wait with the supervisor instruction issue paused. A similar process is also implemented on each of the other tiles 4 in the array 6 (each comprising its own instance of the sync logic 39). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 on the same chip 2, the synchronization controller 36 sends a synchronization acknowledgement signal "sync_ack" back to the sync logic 39 on each of the tiles 4. Up until this point, each of the tiles 4 has had its supervisor instruction issue paused waiting for the synchronization acknowledgment signal (sync_ack). Upon receiving the sync_ack signal, the sync logic 39 in the tile 4 automatically unpauses the supervisor instruction issue for the respective supervisor thread on that tile 4. The supervisor is then free to proceed with exchanging data with other tiles 4 via the interconnect 34 in a subsequent exchange phase 50.

Preferably the sync_req and sync_ack signals are transmitted and received to and from the synchronization controller, respectively, via one or more dedicated sync wires connecting each tile 4 to the synchronization controller 36 in the interconnect 34.

Furthermore, in embodiments, an additional functionality may be included in the SYNC instruction. That is, at least when executed in an inter-tile mode (e.g. SYNC chip), the SYNC instruction also causes the local exit states $LC of each of the synchronized tiles 4 to be automatically aggregated by further dedicated hardware 40 in the interconnect 34. In the embodiment shown this logic 40 takes the AND of the local exits states. However, this is just one example, and in other embodiments the global aggregation logic 40 could e.g. take the Boolean OR, or a more complex combination of non-Boolean exit states.

In response to the synchronization request (sync_req) being received from all of the tiles 4 in the array 6, the synchronization controller 36 causes the output of the global aggregation logic 40 to be stored in a global consensus register ($GC) 42 on each tile 4. This register $GC 42 is accessible by the supervisor thread SV on the respective tile 4 once the supervisor instruction issue is resumed. In embodiments the global consensus register $GC is implemented as a control register in the supervisor's control register file CXS, 28 such that the supervisor thread can get the value in the global consensus register ($GC) 42 by means of a GET instruction.

The globally aggregated exit state $GC enables the program to determine an overall outcome of parts of the program running on multiple different tiles 4 without having to individually examine the state of each individual worker thread on each individual tile. It can be used for any purpose desired by the programmer, e.g. to determine whether or not the parts of the code running on all the tiles have all satisfied a predetermined condition, or an overall degree of confidence in the results of the tiles. In one example use case, the supervisor on one or more of the tiles may report to the host processor 93H if the global aggregate indicated a false or unsuccessful outcome. As another example, the program may perform a branch decision depending on the global exit state.

Figure 12:
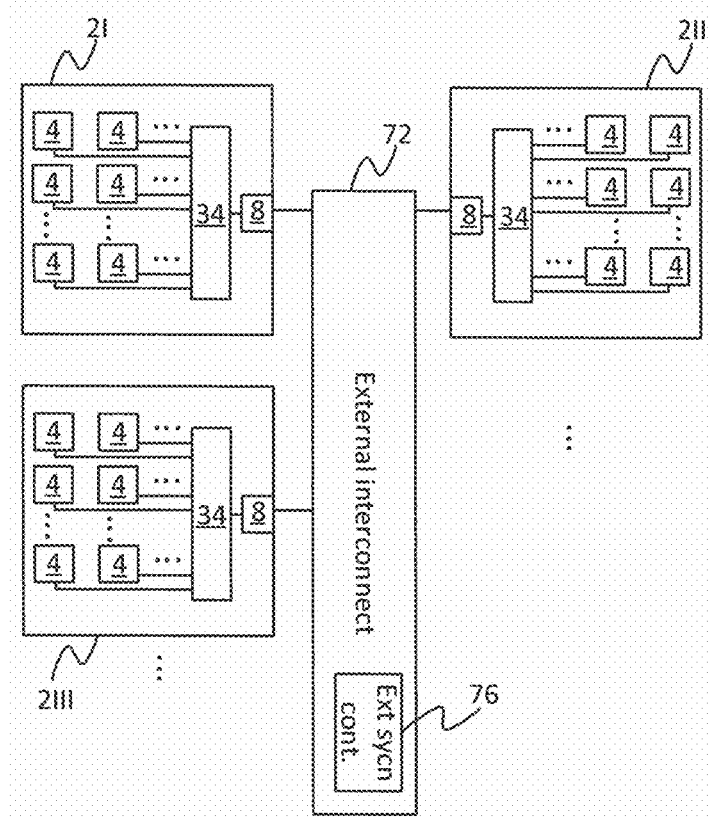
FIG. 12 is a schematic illustration of system of multiple interconnected processor chips.

As mentioned previously, in embodiments multiple instances of the chip 2 can be connected together to form an even larger array of tiles 4 spanning multiple chips 2. This is illustrated in FIG. 12. Some or all of the chips 2 may be implemented on the same IC package or some or all of the chips 2 may be implemented on different IC packages. The chips 2 are connected together by an external interconnect 72 (via the external links 8 shown in FIG. 7). This may connect between chips 2 on the same IC package, different IC packages on the same card, and/or different IC packages on different cards. As well as providing a conduit for exchange of data between tiles 4 on different chips, the external interconnect 72 also provides hardware support for performing barrier synchronization between the tiles 4 on different chips 2 and aggregating the local exit states of the tiles 4 on the different chips 2.

In embodiments, the SYNC instruction can take at least one further possible value of its mode operand to specify an external, i.e. inter-chip, synchronization: SYNC zone_n, wherein zone_n represents an external sync zone. The external interconnect 72 comprises similar hardware logic to that described in relation to FIG. 11, but on an external, inter-chip scale. When the SYNC instruction is executed with an external sync zone of two or more chips 2 specified in its operand, this causes the logic in the external interconnect 72 to operate in a similar manner to that described in relation to the internal interconnect 34, but across the tiles 4 on the multiple different chips 2 in the specified sync zone.

That is, in response to the opcode of the SYNC instruction whose operand specifies an external sync, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst all the external tiles 4 to which, e.g. all the tiles across all chips 2 in the system for a global sync. I.e. the sync logic 76 in the external interconnect 72 will return the sync acknowledgment signal (sync_ack) to the tiles 4 across chips 2 only once a synchronization request (sync_req) has been received from all the tiles 4 from those chips. All the tiles 4 on all those chips 2 will be automatically paused until the sync acknowledgment (sync_ack) from the external sync logic 76 is returned.

Thus, in response to an external SYNC, the supervisor instruction issue is paused until all tiles 4 on all chips 2 in the external sync zone have completed their compute phase 52 and submitted a sync request. Further, logic in the external interconnect 72 aggregates the local exit states of all these tiles 4, across the multiple chips 2 in the zone in question. Once all tiles 4 in the external sync zone have made the sync request, the external interconnect 72 signals a sync acknowledgment back to the tiles 4 and stores the cross-chip global aggregate exit state into the global consensus registers ($GC) 42 of all the tiles 4 in question. In response to the sync acknowledgement, the tiles 4 on all the chips 2 in the zone resume instruction issue for the supervisor.

Note that in embodiments the functionality of the interconnect 72 may be implemented in the chips 2, i.e. the logic may be distributed among the chips 2 such that only wired connections between chips are required (FIGS. 11 and 12 are schematic).

All tiles 4 within the mentioned sync zone are programmed to indicate the same sync zone via the mode operand of their respective SYNC instructions. In embodiments the sync logic 76 in the external interconnect 72 peripheral is configured such that, if this is not the case due to a programming error or other error (such as a memory parity error), then some or all tiles 4 will not receive an acknowledgement, and therefore that the system will come to a halt at the next external barrier, thus allowing a managing external CPU (e.g. the host) to intervene for debug or system recovery. Preferably however the compiler is configured to ensure the tiles in the same zone all indicate the same, correct sync zone at the relevant time. The sync logic may also be configured to take other alternative or additional measures in event of inconsistency in the modes indicated by the different SYNC instruction, e.g. raising an exception to the external CPU, and/or halting execution by some other mechanism.

Figure 14:
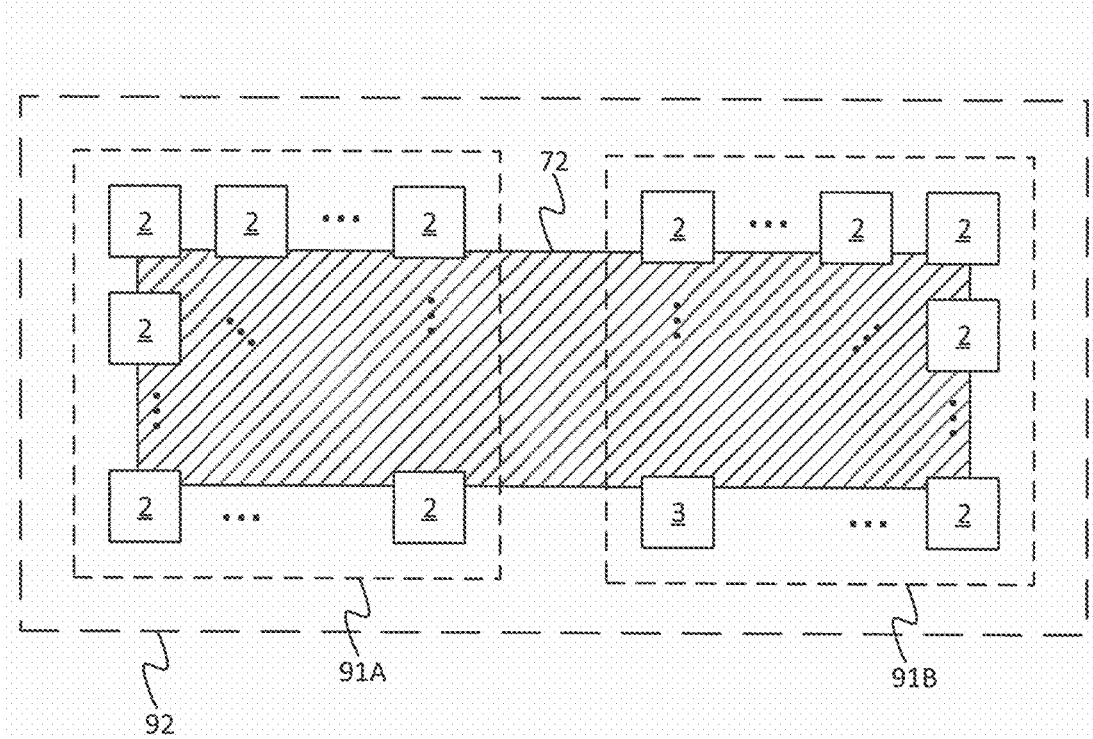
FIG. 14 is another schematic illustration of a system of multiple processor chips.

As illustrated in FIG. 14, in embodiments the mode of the SYNC instruction can be used to specify one of multiple different possible external sync zones, e.g. zone_1 or zone_2. In embodiments these correspond to different hierarchical levels. That is to say, each higher hierarchical level 92 (e.g. zone 2) encompasses two or more zones 91A, 91B of at least one lower hierarchical level. In embodiments there are just two hierarchical levels, but higher numbers of nested levels are not excluded. If the operand of the SYNC instruction is set to the lower hierarchical level of external sync zone (SYNC zone_1), then the above-described sync and aggregation operations are performed in relation to the tiles 4 on the chips 2 in only the same lower-level external sync zone as the tile on which the SYNC was executed. If on the other hand the operand of the SYNC instruction is set to the higher hierarchical level of external sync zone (SYNC zone_2), then the above-described sync and aggregation operations are automatically performed in relation to all the tiles 4 on all the chips 2 in the same higher-level external sync zone as the tile on which the SYNC was executed.

In response to the opcode of the SYNC instruction having an external sync zone as an operand, the execution stage 18 causes the sync level specified by the operand to be signalled to dedicated hardware sync logic 76 in the external interconnect 72. In response to this, the sync logic 76 in the external interconnect conducts the process of synchronisation request (sync_req) and acknowledgment (sync_ack) to be performed only amongst the tiles 4 of the signalled group. I.e. the sync logic 76 in the external interconnect 72 will return the sync acknowledgment signal (sync_ack) to the tiles in the signalled sync zone only once a synchronization request (sync_req) has been received from all the tiles 4 in that zone (but will not wait for any other tiles outside that zone if it is not a global sync).

Note that in other embodiments, the sync zones that can be specified by the mode of the SYNC instruction are not limited to being hierarchical in nature. In general, a SYNC instruction may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

Figure 18:
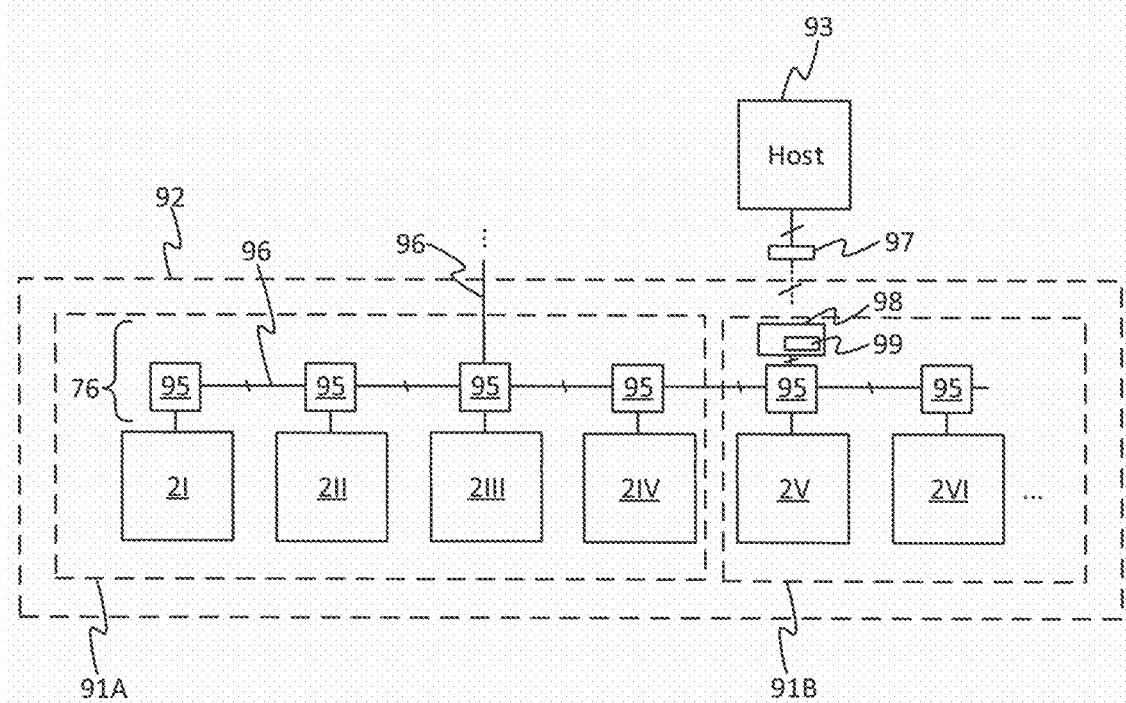
FIG. 18 illustrates example wiring for synchronizing between chips, and FIG. 19 schematically illustrates a flow control mechanism for external exchange, FIG. 20 schematically illustrates a program flow involving a host sync proxy.

An example mechanism for implementing the synchronization amongst the selected sync group 91, 92 is illustrated in FIG. 18. As illustrated, the external sync logic 76 in the external interconnect 72 comprises a respective sync block 95 associated with each respective chip 2. Each sync block 95 comprises respective gating logic and a respective sync aggregator. The gating logic comprises hardware circuitry which connects together the chips 2 in a daisy chain topology for the purpose of synchronization and exit state aggregation, and which propagates the sync and exit state information in accordance with the following. The sync aggregator comprises hardware circuitry configured to aggregate the synchronization requests (sync_req) and the exit states in accordance with the following.

The respective sync block 95 associated with each chip 2 is connected to its respective chip 2, such that it can detect the sync request (Sync_req) raised by that chip 2 and the exit state of that chip 2, and so that it can return the sync acknowledgment (Sync_ack) and global exit state to the respective chip 2. The respective sync block 95 associated with each chip 2 is also connected to the sync block 95 of at least one other of the chips 2 via a sync interface comprising one or more sync wires 96 (part of the sync network). Some of the chips' sync blocks 95 are connected to that of two adjacent chips 2, each connection via a respective instance of the sync interface 96. This way, the chips 2 can be connected in one or more daisy chains via their sync blocks 95. This enables the sync requests, sync acknowledgments, running aggregates of exit states, and global exit states, to be propagated up and down the chain.

In operation, for each sync group 91, 92, the sync block 95 associated with one of the chips 2 in that group is set as the master for synchronization and exit state aggregation purposes, the rest in the group being slaves for this purpose. Each of the slave sync blocks 95 is configured with the direction (e.g. left or right) that it needs to propagate sync requests, sync acknowledgments and exit states for each sync group 91, 92 (i.e. the direction toward the master). In embodiments these settings are configurable by software, e.g. in an initial configuration phase after which the configuration remains set throughout the subsequent operation of the system. For instance this may be configured by the host processor. Alternatively it is not excluded that the configuration could be hard-wired. Either way, the different sync groups 91, 92 can have different masters and in general it is possible for a given chip 2 (or rather its sync block 95) to be master of one group and not another group of which it is a member, or to be master of multiple groups.

For instance, by way of illustration consider the example scenario of FIG. 18. Say for the sake of example that the sync block 95 of chip 2IV is set as the master of a given sync group 91A. Consider now the first chip 2I in the chain of chips 2, connected via their sync blocks 95 and interface 96 ultimately to chip 2IV. When all the worker threads of the current compute phase on the first chip 2I have executed an EXIT instruction, and the supervisors on all the (participating) tiles 4 have all executed a SYNC instruction specifying the sync group 91A, then the first chip 2I signals its sync readiness to its respective associated sync block 95. The chip 2I also outputs to its respective sync block 95 its chip-level aggregated exit state (the aggregate of all the exiting workers on all the participating tiles on the respective chip 2I). In response, the sync block 95 of the first chip 2I propagates a sync request (Sync_req) to the sync block 95 of the next chip 2II in the chain. It also propagates the exit state of the first chip 2I to the sync block 95 of this next chip 2II. The sync block 95 of this second chip 2II waits until the supervisors of its own (participating) tiles 4 have all executed a SYNC instruction specifying the sync group 91A, causing the second chip 2II to signal sync readiness. Only then does the second chip's sync block 95 propagate a sync request to the sync block 95 of the next (third) chip 2III in the chain, and also propagates a running aggregate of the exit state of the first chip 2I with that of the second 2II. If the second chip 2II had become sync ready before the first 2I, then the sync block 95 of the second chip 2II would have waited for the first chip 2I to signal a sync request before propagating the sync request to the sync block 95 of the third chip 2III. The sync block 95 of the third chip 2III behaves in a similar manner, this time aggregating the running aggregate exit state from the second chip 2II to obtain the next running aggregate to pass onwards, etc. This continues toward the master sync block, that of chip 2IV in this example.

The sync block 95 of the master then determines a global aggregate of all the exit states based on the running aggregate it receives and the exit state of its own chip 2IV. It propagates this global aggregate back out along the chain to all the chips 2, along with the sync acknowledgement (Sync_ack).

If the master is part way along a chain, as opposed to being at one end as in the above example, then the sync and exit state information propagates in opposite directions either side of the master, both sides toward the master. In this case the master only issues the sync acknowledgment and global exit state once the sync request from both sides has been received. E.g. consider the case where chip 2III is master of group 92. Further, in embodiments the sync block 95 of some of the chips 2 could connect to that of three or more other chips 2, thus creating multiple branches of chains toward the master. Each chain then behaves as described above, and the master only issues the sync acknowledgment and global exit state once the sync request from all chains has been received. And/or, one or more of the chips 2 could connect to an external resource such as the host processor, a network card, a storage device or an FPGA.

Note that the above is only the mechanism for propagating sync and exit state information. The actual data (content) is transmitted by another channel, for example as discussed later with reference to FIG. 19. Further, it will be appreciated that this is only one example implementation, and the skilled person will be capable of building other circuits for implementing the disclosed synchronization and aggregation functionality once given the specification of that functionality disclosed herein.

Regardless of the particular mechanism for signalling sync and exit state information, according to the present invention there is provided a mechanism for enabling a host processor or subsystem 93 to communicate with any work accelerator sub-system that operates with either a single point of rendezvous for all its participants (such as BSP), or in some embodiments a sufficiently small number of points of rendezvous (such as a number of independent BSP accelerators all connected to one host) such that implementation of a host-processor friendly synchronisation mechanism can be implemented in hardware in a particularly efficient manner. This situation may contrasted with a traditional CSP approach in which the number of points of rendezvous is application specific and thus the synchronization mechanisms such as semaphores must be software defined and thus subject to inefficiencies that follow from this (e.g. processor interrupt latency).

The host 93 here may represent a host processor or CPU 93H, e.g. as described in relation to FIG. 21; or a gateway processor 93GW of a wider host subsystem, e.g. as described in relation to FIG. 22.

As shown in FIG. 18 (and referring also to FIG. 12), the overall system comprises at least one host processor 93, and an external host interface 97 for connecting the host processor 93 to the external interconnect 72 (including to the external sync logic 76). For example in embodiments the host interface 97 may take the form of a PCI interface. The sync logic 76 of the external interconnect 72 further comprises at least one "host sync proxy" (HSP) module 98. The HSP module 98 is connected between the interface 97 and one of the sync blocks 95. The HSP module 98 is arranged to act as a proxy on behalf of the host 93 for synchronization purposes, to enable the host processor 93 to participate in the synchronization amongst at least one of the sync zones or groups 91, 92, as will be discussed in more detail shortly.

In embodiments one HSP module 98 is provided per chip 2 and per corresponding sync block 95. In this case, whichever sync block 95 is configured as the master of a given sync group 91, 92, the HSP 98 of that sync block is set as the proxy of the host 93 within the group and the other HSPs are disabled. Thus as with the sync blocks 95, the HSPs 98 can be configured per sync group 91, 92. So one HSP 98 can be set as the host proxy for one sync group, e.g. 91A or 91B, whilst another HSP 98 can be set as the host proxy for another group, e.g. 91B or 92; or the same HSP 98 may be set as the host proxy for multiple groups, e.g. both 91 and 92. To this end the host interface 97 is connected to the HSPs 98 so that the HSP 98 selected for each group 91, 92 may be configurable by software by writing to registers of the HSP modules 98 via the PCI interface 97. Alternatively it is not excluded that the configuration could be hard-wired or the HSP registers updated via a different interface or protocol. It is also not excluded that in yet further alternative embodiments, there could be a single fixed HSP 98 per sync group 91, 92, or even a single fixed HSP 98 for the whole array or subsystem 6.

The or each host sync proxy (HSP) module 98 comprises hardware circuitry configured to enable the host 93 to participate in the respective sync group 91, 92 in which that HSP 98 is arranged to act as the host's proxy. A sync request emitted by the tiles 4, if it is a sync with host involvement, will be conveyed by the sync logic 95 to the active HSP 98 for that group whereas a sync request which does not specify host involvement will be aggregated and returned to the requesting tiles without involving the HSP 98 in any way. Thus the tiles 4 determine by virtue of the program they execute when, if at all, the accelerator requires to interact with the host via the HSP 98.

By way of illustration, consider an instance of the HSP 98 configured to act as proxy of the host 93 with respect to the global sync group 92. E.g. in FIG. 18, purely by way of illustration. It will be appreciated that analogous functionality can be described for the host's participation in any, lower level sync group also, such as those labelled 91.

The host 93 is asynchronous and non-time-deterministic with respect to the rest of the sync group 92, and separated by a relatively large amount of wiring and physical logic. In addition any communication with the host likely requires the host to take an interrupt following which there is a considerable latency for handling the interrupt and then switching contexts to the host code that would deal with the sync request. These factors mean the latency of any interaction involving the host 93 is poor. It would be desirable to avoid needing to communicate directly with the host 93 as much as possible.

To this end, the HSP 98 comprises a set of registers comprising at least one counter 99, and associated counting logic arranged to operate as follows. The counter 99 is arranged so that an integer value n can be written to it by the host 93 via the host interface 97, in embodiments such that the value written is added to the value already present in this register 99. The number in the counter 99 may be described as a number of credits, or a mark count (e.g. ipu_mark_count). When the HSP counter has a value of 1 or greater than the sync group 92 in which the HSP 98 in question is acting as the host's proxy, the HSP 98 is then configured to generate a sync acknowledgement (sync_ack) when it receives a sync request from the tiles 4 in the sync group 92. The associated counting logic automatically decrements n by one in the counter 99 each time a sync acknowledgement is generated and the corresponding barrier is passed (e.g. barrier 80 in the case of sync group 92). This process occurs without the requirement for the HSP to contact or otherwise interrupt the host. But if the counter value n has now reached zero, the HSP does not generate the sync-acknowledge and therefore does not allow the tiles 4 in the group 92 to continue running again until both: i) all the tiles 4 in that group 92 have sent a sync request (sync_req), and ii) the HSP 98 performs a write to the HSP 98 via the host interface 97 explicitly granting the barrier to be released. In embodiments, this second subcondition ii) is implemented by the HSP 98 checking that the HSP counter 99 now has a value of 1 or greater—i.e. the counter has been granted with more credits again by the host 93 writing to the counter 99 via the host interface 97. Thus the tiles 4 of the group can be allowed to continue running through n barriers without deferring at all to the host 93, after which they must then synchronize with the host 93 (and may then exchange data to and/or from the host). See for example FIG. 20. In some cases, the host may arrange its operation for maximum efficiency by ensuring that the HSP counter value never falls to zero and thus the accelerator never pauses to sync with the host.

Preferably the software running on the tiles 4 is free to choose whether to request HSP involvement or not, by collectively marking their respective sync requests as either requiring or not requiring host involvement. In such embodiments the above behaviour is applied only by the HSP 98 for the barriers corresponding to sync requests marked as requiring host involvement (the "involvement" of the host for any given barrier being either the proxy granting of the sync ack by the HSP 98 on behalf of the host, or occasionally the explicit granting of more credit). The program is arranged so that all tiles 4 in a given group 91, 92 signal the same choice in their sync requests (HSP involvement or not) for a given barrier synchronization. In embodiments the host involvement is selected by different variants of the mode of the SYNC instruction. That is, for each sync group 91, 92, there is effectively two variants that the operand of the SYNC instruction can take: zone_1_host, zone_1_no_host; and zone_2_host, zone_2_no_host. The execution unit 18 is configured to act upon the operand, and in response to cause the synchronization logic in the interconnect 72, 76 to signal the host involvement marker accordingly. In other embodiments however, it is not excluded that other mechanisms could be implemented for requesting host involvement, or even (though less preferred) that host involvement is hard-wired and therefore always imposed (i.e. counter 99 is always consulted).

Another function of the HSP 98 is to notify the host by writing a notification message directly to the host's memory (in this embodiment, over the PCI interface). The notification message includes the current contents of the HSP 98 which includes the aforementioned counter value. Optionally the HSP 98 can also be configured to interrupt the host at this point. The host therefore has the option of waiting for an interrupt from the HSP or of polling the memory location written by the HSP with either method serving to alert the host to the current new state of the HSP including the value of its counter. The host program may then take such measures as it requires in order to prepare for future barriers following which it posts incremental values to the HSP counter.

In embodiments, preparation for barriers performed by the host may include the preparation of data to be fetched by the accelerator, such as experience data sets required by the accelerator for the next stage in learning a model. Preparation in this context may include fetching the data from storage disks or other media, formatting data in a form which is required by the training algorithm running on the accelerator or decompression of image data. Additionally, preparation for barriers may include consuming output data produced by the accelerator.

Another function of the HSP 98 is to communicate the exit state value of the accelerator that accompanies the sync request from the Tiles 4 to the host 93, via the notification message mentioned previously.

Another function of the HSP 98 is to allow the host program to specify its own exit state value by writing it to one of the HSP registers. Thereafter when the HSP 98 generates a sync-acknowledge for the tiles 4, the aggregated exit state of all the tiles 4 is also aggregated with the exit state value that has been provided by the host 93.

Another function of the HSP 98 is to allow the host program to specify an expected exit state value which corresponds to the exit state it most commonly expects the tiles 4 to provide along with their sync request. When the host 93 provides an expected exit state in this way, then so long as the tiles 4 exit state matches the value provided by the host the operation of the HSP is as described previously, with the HSP generating a sync-acknowledge while the HSP counter value n is greater than zero. Alternatively if the host's expected exit state value does not match the value provided by the tile 4 then the HSP 98 does not generate a sync-acknowledge to the Tiles 4. Because the tile's exit state 4 is provided during the notification write mentioned above and the accelerator will be stalled at the barrier where the tile exit state and host exit state differ, the host program is able to take such barrier preparation measures as may be required to satisfy the conditions signalled by the change in exit state and then re-establish the counter value n such that the value reflects the new preparations made. To facilitate this re-establishment of the counter value, the HSP interprets a write to the HSP register with a count value of zero as an instruction to zero the counter value rather than to increment the counter value by zero which would have the undesired effect of leaving the counter value unchanged.

An unexpected exit state event as described above may entail abandoning previous preparations made by the host in anticipation of the Tile exit state matching the expected value but in general the loss of efficiency resulting from this event is small compared to the loss of efficiency that would be incurred if the accelerator had to interrupt or involve the host directly at each barrier, so long as the occurrence of the unexpected exit state value is rare relative to occurrences of the expected exit state value.

N.B. an equivalent counter 99 for decrementing the number of credits could be implemented as a counter that starts at zero and then automatically increments up toward a target value held in a register. Other implementations may also be apparent to a person skilled in the art. By "decrement" herein, it is meant to refer to the underlying substantive effect of counting out a remaining number of automatically diminishing credits, rather than to refer to a particular implementation in terms of logical counting direction or such like.

In embodiments, the HSP 98 associated with each chip 2 comprises a plurality of instances of the counter 99 and the associated counting logic, one instance for each of some or all of the possible sync groups 91, 92 of which the respective chip can potentially be a member. Thus the HSP 98 can maintain a different number of sync credits for each of multiple sync groups 91, 92, e.g. multiple hierarchical levels. Alternatively a given HSP 98 only comprises one counter 99 for maintaining the sync credits for one sync group, but there are multiple HSPs each of which can be configured to act as described above in a different respective one of the groups 91, 92 (e.g. multiple hierarchical levels). For example as described above, in embodiments there is one HSP 98 per chip 2, each which can be attached to a given sync group 91, 92 by the host 93. In other alternatives, it is not excluded that there is only a single global HSP 98 with only a single counter 99 for maintaining a number of sync credits for a single sync group, e.g. the global group 92.

Also, in general, note that it is possible for the above arrangement to be applied to one or more host processors 93. For instance, one HSP 98 can be configured to involve one host processor 93 in one of the sync groups 91, 91, whilst another HSP may be configured to involve another host processor in another of the sync groups 91, 92. In this case each the HSP 98 of each host 93 represents its respective host 93 in relation to the respective sync group 91, 92 in a similar manner to that described above. Or in another example, in some embodiments it may be possible to involve two host processors 93 in the same sync group 91 or 92. In this case, a given HSP 98 may include a separate counter 99 for each host 93; or different HSPs 98 may be set for a given group, one for each host 93. Either way, the counters 99 are written with a respective number of sync credits by each respective host 93. When either counter 99 has decremented to zero a sync acknowledgement to the tiles 4 will not be issued.

As mentioned previously, not all tiles 4 need necessarily participate in the synchronization. In embodiments, as discussed, the group of participating tiles can be set by the mode operand of the sync instruction. However, this only allows for selection of predefined groups of tiles. It is recognized herein that it would also be desirable to be able to select sync participation on a tile-by-tile basis. Therefore in embodiments, there is provided an alternative or additional mechanism for selecting which individual tiles 4 participate in the barrier synchronization.

Particularly, this is achieved by providing an additional type of instruction in the processor instruction set, to be executed by one or some tiles 4 in place of the SYNC instruction. This instruction may be referred to as the "abstain" instruction, or "SANS" instruction (start automatic non-participatory sync). In embodiments the SANS is reserved for use by the supervisor thread. In embodiments it takes a single immediate operand:

SANS n_barriers

The behaviour of the SANS instruction is to cause the tile on which it is executed to abstain from the current barrier synchronization, but without holding up the other tiles which are waiting for all tiles in the specified sync group to SYNC. In effect it says "go on without me". When the SANS instruction is executed, the opcode of the SANS instruction triggers the logic in the execution unit of the execution stage 18 to send an instance of the synchronization request signal (Sync_req) to the internal and/or external sync controller 36, 76 (depending on the mode). In embodiments, the sync request generated by the SANS applies to any sync group 91, 92 that encompass the tile 4 that executed the SANS. I.e. for whatever sync group the tiles 4 in this local chip or chips are using next (they must agree on the sync group), the sync_req from those that have executed SANS will always be valid.

Thus from the perspective of the sync controller logic 36, 76 and the other tiles 4 in the sync group, the tile 4 executing the SANS instruction appears exactly as a tile 4 executing a SYNC instruction, and does not hold up the sync barrier and the sending of the sync acknowledgment signal (Sync_ack) from the sync logic 36, 76. I.e. the tiles 4 executing the SANS instead of the SYNC does not hold up or stall any of the other tiles 4 involved any sync group of which the tile in question is otherwise a member. Any handshake performed by a SANS is valid for all sync groups 91, 92.

However, unlike the SYNC instruction, the SANS instruction does not cause supervisor instruction issue to be paused awaiting the sync acknowledgment signal (Sync_ack) from the sync logic 36, 76. Instead the respective tile can simply continue uninhibited by the current barrier synchronization that is being conducted between the other tiles 4 that executed SYNC instructions. Thus by mimicking a sync but not waiting, the SANS instruction allows its tile 4 to press on with processing one or more tasks whilst still allowing the other tiles 4 to sync.

The operand n_barriers specifies the number of "posted" syncs, i.e. the number of future sync points (barriers) the tile will not be participating in. Alternatively it is not excluded that in other embodiments the SANS instruction does not take this operand, and instead each execution of the SANS instruction causes only a one-off abstention.

By means of the SANS instruction, certain tiles 4 may be responsible for performing tasks outside the direct scope of the BSP operating schedule. For example, it may be desirable to allocate a small number of tiles 4 within a chip 2 to initiate (and process) data transfers to and/or from host memory while the majority of tiles 4 are occupied with the primary computation task(s). In such scenarios those tiles 4 not directly involved with primary computation can declare themselves as effectively disconnected from the synchronization mechanism for a period of time using the automatic non-participatory sync feature (SANS). When using this feature, a tile 4 is not required to actively (i.e. via execution of the SYNC instruction) signal its readiness for synchronization (for any of the synchronization zones), and in embodiments makes a null contribution to the aggregated exit status.

The SANS instruction begins or extends a period during which the tile 4 on which it is executed will abstain from active participation in inter-tile synchronization (or synchronization with other external resources if they are also involved in the synchronization). During this period, this tile 4 will automatically signal its readiness for synchronization, within all zones, and in embodiments also make a null contribution to the global aggregated consensus $GC. This time period may be expressed as an unsigned immediate operand (n_barriers) indicating how many additional future synchronization points will be automatically signalled by this tile 4. Upon execution of the SANS, the value n_barriers specified by its operand is placed into a countdown register $ANS_DCOUNT on the respective tile 4. This is a piece of architectural state used to keep a track of how many additional future sync_reqs should be made. If the automatic non-participatory sync mechanism is currently inactive, the first assertion of readiness (sync request, sync_req) will be performed immediately. Subsequent assertions will occur in the background, once the previous synchronization has completed (i.e. following assertion of the sync acknowledgment, sync_ack). If the automatic non-participatory sync mechanism is currently active, the countdown counter register $ANS_DCOUNT will be updated in an automatic manner, such that no sync acknowledgment signal is left unaccounted for. The automatic non-participatory sync mechanism is implemented in dedicated hardware logic, preferably an instance of it in each tile 4, though in other embodiments it is not excluded that it could instead be implemented centrally for a group of tiles or all tiles.

With regard to the exit state behaviour, there are in fact a number of possibilities depending on implementation. In embodiments, to obtain the globally aggregated exit state, the sync logic 36, 76 only aggregates the local exit states from those tiles 4 in the specified sync group that executed a SYNC instruction, and not those that/those that executed a SANS instruction (the abstaining tile or tiles). Alternatively, the globally aggregated exit state is obtained by aggregating the local exit states from all the tiles 4 in the sync group that executed a SYNC and those that executed a SANS (both the participating and abstaining tiles 4). In the latter case, the local exit state output by the abstaining tile(s) 4 for global aggregation may be the actual locally aggregated exit state of that tile's workers at the time of executing the SANS, just as with the SYNC instruction (see description of local consensus register $LC 38). Alternatively the local "exit state" output by the abstaining tile 4 may be a default value, for instance the true value (e.g. logic 1) in embodiments where the exit state is binary. This prevents the abstaining tile 4 from interfering with the global exit state in embodiments where any false local exit state causes the global exit state to be false.

Regarding the return of the global exit state, there are two possibilities for this, regardless of whether or not the abstaining tile submits a local exit state for producing the global aggregate, and regardless of whether that value was an actual value or a default value. That is, in one implementation, the global aggregate exit state produced by the sync logic 36, 76 in the interconnect 34, 72 is stored only in the global consensus registers $GC 42 of the participating tiles 4, which executed a SYNC instruction, and not the abstaining tiles 4 which instead executed a SANS instruction. In embodiments, instead a default value is stored in the global consensus register $GX 42 of the tile(s) 4 that executed a SANS (the abstaining tiles). For instance this default value may be true, e.g. logic 1, in the case of a binary global exit state. In an alternative implementation however, the actual global aggregate produced by the sync logic 36, 76 is stored in the global consensus registers $GC 42 of both the participating tiles 4 which executed SYNC instructions and the abstaining tiles 4 which instead executed a SANS instruction. Thus all tiles in the group may still have access to the globally aggregated exit state.

Figure 13:
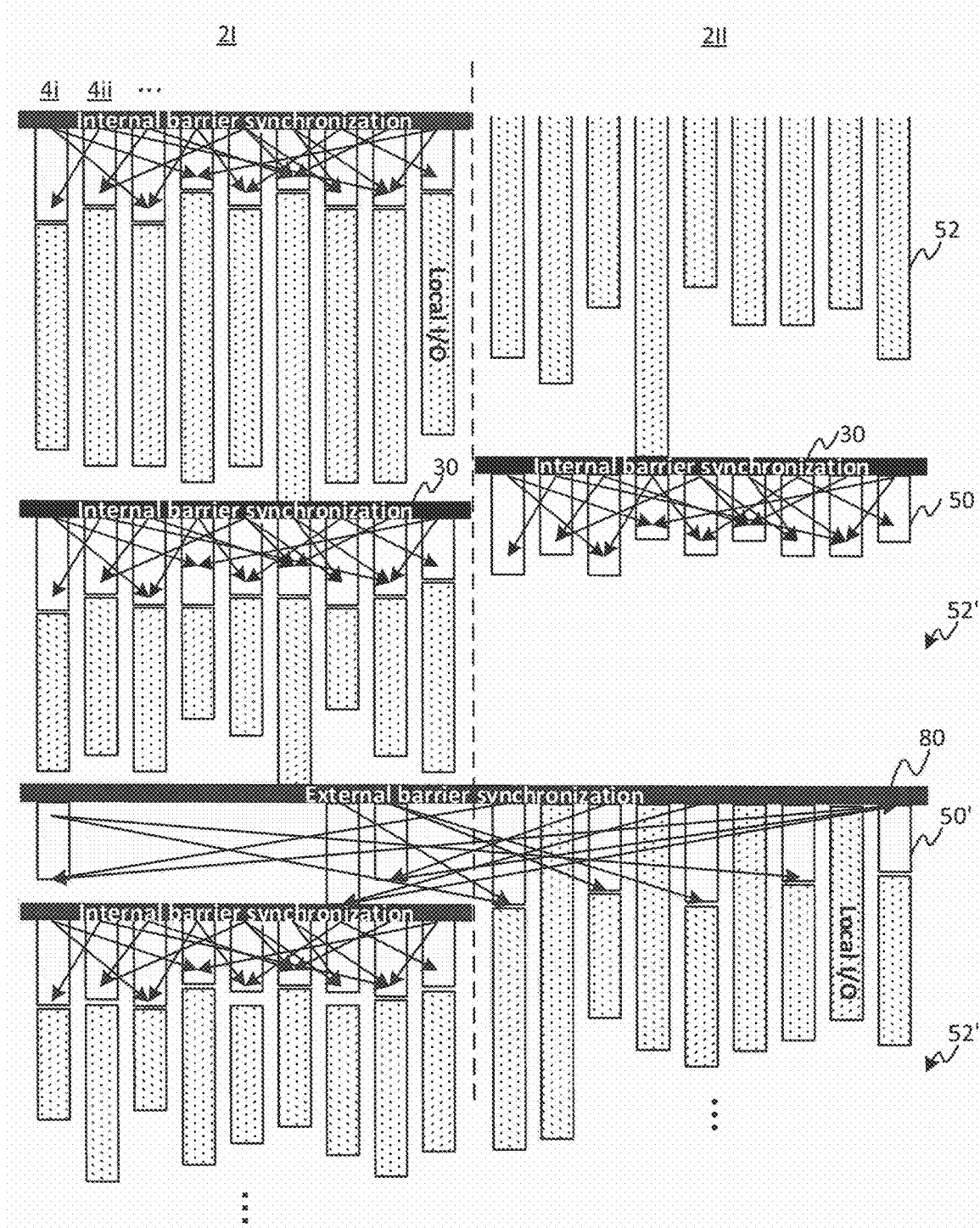
FIG. 13 is a schematic illustration of a multi-tier BSP scheme.

FIG. 13 illustrates an example BSP program flow involving both internal (on-chip) and external (inter-chip) synchronizations. As shown, the flow comprises internal exchanges 50 (of data between tiles 4 on the same chip 2) and the external exchanges 50' (of data between tiles 4 on different chips 2).

As illustrated in FIG. 13, in embodiments it is disclosed to keep the internal BSP supersteps (comprising the internal exchanges 50 of data between tiles 4 on the same chip 2) separate from the external sync and exchange (comprising the external exchanges 50' of data between tiles 4 on different chips 2).

Accordingly, the program may be arranged to perform a sequence of synchronizations, exchange phases and compute phases comprising in the following order: (i) a first compute phase, then (ii) an internal barrier synchronization 30, then (iii) an internal exchange phase 50, then (iv) an external barrier synchronization 80, then (v) an external exchange phase 50'. See chip 2II in FIG. 13. The external barrier 80 is imposed after the internal exchange phase 50, such that the program only proceeds to the external exchange 50' after the internal exchange 50. Note also that as shown with respect to chip 2I in FIG. 12, optionally a compute phase may be included between internal exchange (iii) and external barrier (iv).

This overall sequence is enforced by the program (e.g. being generated as such by the compiler). In embodiments the program is programmed to act in this way by means of the SYNC instruction described previously. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is ensured to be at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix. However, due to the loss of time determinism that occurs in the external interconnect 72 in some embodiments, then in such embodiments, once a tile has performed an external communication it cannot perform an internal communication again until the next synchronization (see below explanation of the preferred on-chip communication mechanism which relies on predetermined knowledge of message timing and inter-tile delays).

In some embodiments, also as shown in FIG. 13, some tiles 4 may perform local input/output during a compute phase, for example they may exchange data with a host. Note also that as shown in FIG. 13, it is in general possible for any or all tiles to have a null compute phase 52 or a null exchange phase 50 in any given BSP superstep.

In embodiments, the different levels of sync zones 91, 92 may be used to constrain the extent of some of the external sync & exchange operations to only a subgroup of the chips 2 in the system, and limit the number of times the penalty of a full, global sync and exchange is needed. That is, the overall cycle may comprise: (i) a first compute phase, then (ii) an internal barrier synchronization, then (iii) an internal exchange phase, then (iv) an external barrier synchronization 80 within the tiles of only a first, lower level sync zone 91; then (v) an external exchange phase between only the chips of the first sync zone 91; then (vi) an external barrier synchronization across a second, higher level sync zone 92; then (vii) an external exchange phase amongst the chips of the second level sync zone 92. The external barrier to the second level exchange phase is imposed after the first level external exchange phase, such that the program only proceeds to the second level external exchange after the first level exchange phase. This behaviour may be programmed by using the SYNC instruction qualified by different levels of the external mode in its operand.

In embodiments the highest hierarchical level of sync zone encompasses all the tiles 4 on all chips 2 in the array 6, i.e. it is used to perform a global sync. When multiple lower-level zones are used, BSP may be imposed internally amongst the group of tiles 4 on the chip(s) 2 within each zone, but each zone may operate asynchronously with respect to one another until a global sync is performed.

Note: with regard to the lower-level external synchronization and exchange (iv)-(v), any of the lower-level zones 91A, 91B may each be performing its own instance of the lower-level external exchange in parallel with the other lower-level zone(s). And/or, in some cases multiple instances of (i)-(v) may be implemented before (vi)-(vii), i.e. there may be multiple instances of the lower-level external BSP superstep before the external sync and exchange. Further, the scheme could be extended to three or more hierarchical levels of sync zone.

In general the host 93 may be involved in any one or more of the hierarchical levels of sync.

Figure 20:
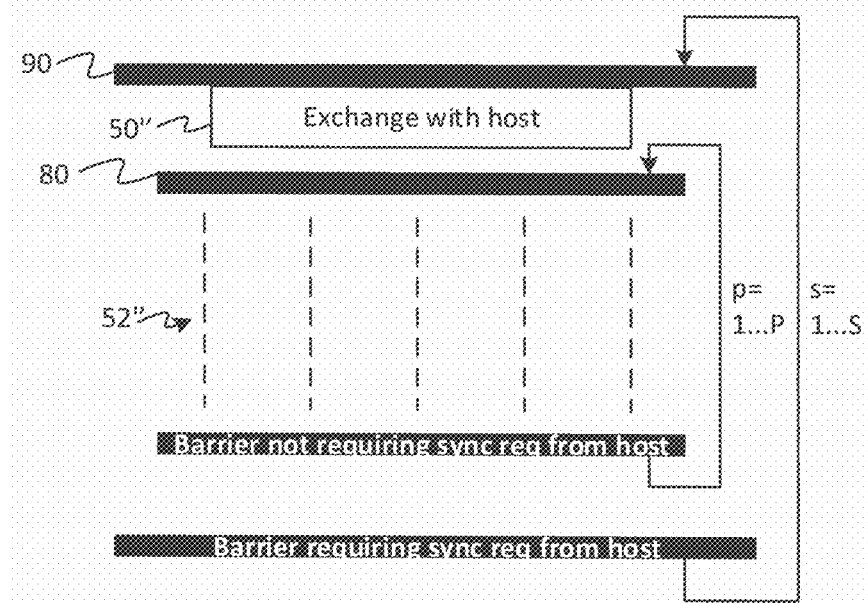

An example is illustrated schematically in FIG. 20 for the global sync zone 92. The system is allowed to perform a number P of BSP iterations p, passing through P sync barriers 80, before a barrier 90 also requiring sync acknowledgment from the host 93 is imposed. The P sync barriers require sync requests from all the (non abstaining) tiles 4 in the relevant sync group 92 but not the host 93. The subsequent sync barrier 80 requires sync requests from all the (non abstaining) tiles 4 in the sync group 92 and that the host 93 has previously indicated permission to pass the particular barrier. After this barrier 90 an exchange 50" may be performed between the host 93 and one or more of the tiles 4, e.g. for one or more of the tiles 4 to report computation results to the host 93.

Figure 16:
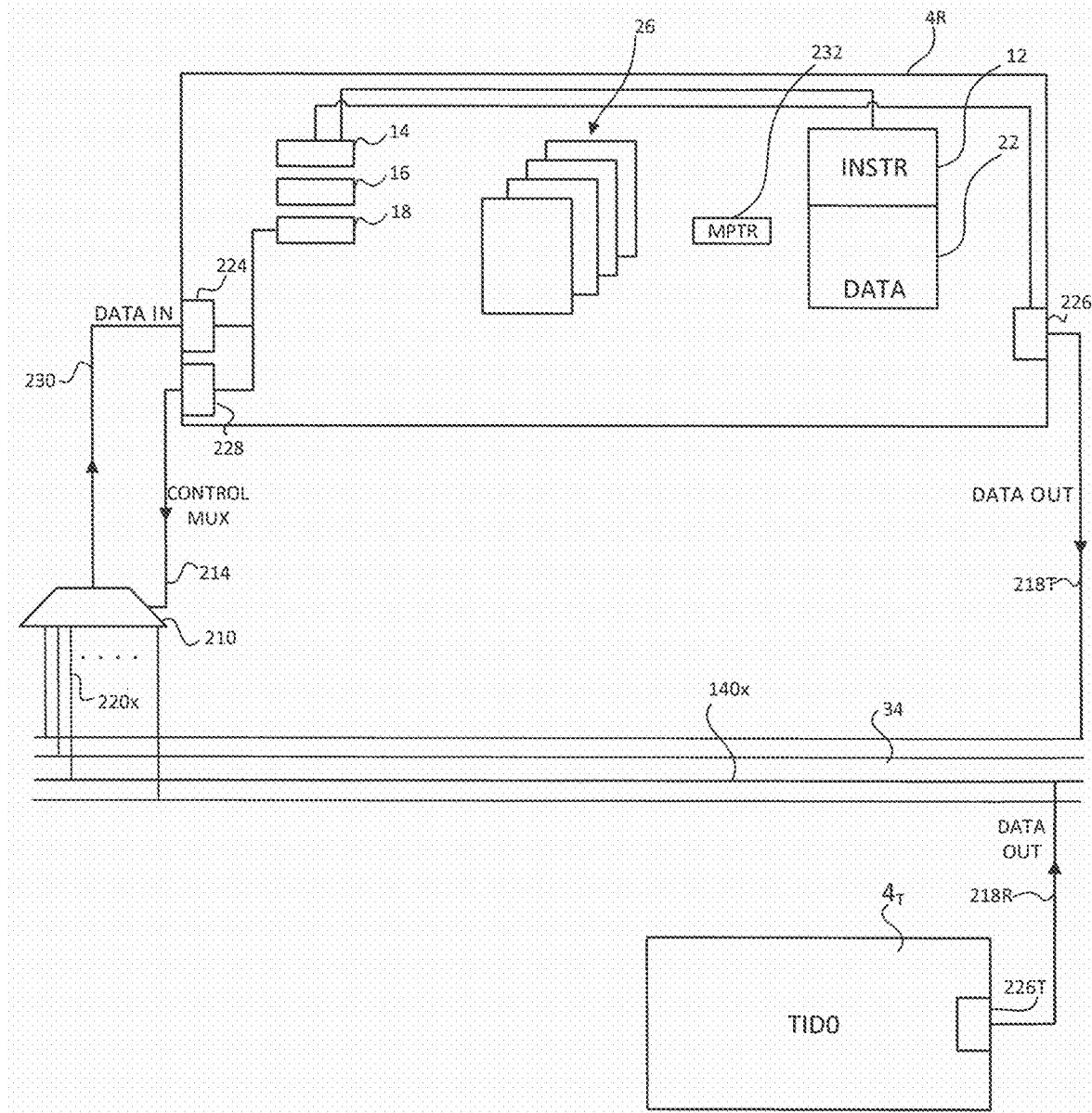

The following describes an exemplary mechanism for communicating on-chip (internal exchange) without the need for queues. Reference is made to FIG. 16. The communication without queues can be achieved by the compiler knowing the time at which each tile 4 transmits its data, and also knowing the on-chip inter-tile delay between the transmitting and receiving tile. Given this predetermined knowledge, the compiler can then program the receiving tile to listen to the address of the transmitting tile at a specific, known time after the transmission of the relevant data by the transmitting tile, i.e. the transmit time plus the inter-tile delay. The timing of the transmission is known by the compiler because the compiler itself selects at which point in each thread to include the send instruction(s). Further, the inter-tile delay, for on-chip communications, is a fixed knowable value for a given pair of transmitting and receiving tiles 4. The compiler may know this from a look-up table of inter-tile delays for different possible combinations of sending and receiving tiles. The compiler can then include the corresponding receive instruction, to listen to the sender's address, at the corresponding number of cycles after the transmit instruction.

On each chip 2, the chip 2 comprises a respective clock which controls the timing of chip activity. The clock is connected to all of the chip's circuits and components. The chip 2 also comprises the internal, time-deterministic interconnect or "switching fabric" 34 to which all tiles and links are connected by sets of connection wires. In embodiments the interconnect 34 may be stateless, in that it has no state readable by software. Each set of connection wires is fixed end to end. The wires are pipelined. Each set can carry a packet consisting of one or more datums, with one datum being transferred per clock cycle. But note herein that the word "packet" denotes a set of bits representing a datum (sometimes referred to herein as a data item), perhaps with one or more valid bit. The "packets" do not have headers or any form of destination identifier (which permits an intended recipient to be uniquely identified), nor do they have end-of-packet information. Instead, they each represent a numerical value input to or output from a tile. Each tile has its own local memory (described later). The chip 2 has no shared memory. The switching fabric 24 constitutes a cross set of connection wires only and also does not hold any state. Data exchange between tiles on the same chip is conducted on a time deterministic basis as described herein. A pipelined connection wire comprises a series of temporary stores, e.g. latches or flip flops which hold datum for a clock cycle before releasing it to the next store. Time of travel along the wire is determined by these temporary stores, each one using up a clock cycle of time in a path between any two points.

Each tile 4 indicates its synchronisation state to the sync controller 36 in the internal interconnect 34. Once it has been established that each tile 4 is ready to send data, the synchronisation process 30 causes the system to enter the exchange phase 50. Note that each tile experiences the sync_ack with a different but known time delay. The supervisor program inserts additional cycle delays as required such that each tile begins its exchange phase on the exact same cycle. In this exchange phase, data values move between tiles (in fact between the memories of tiles in a memory-to-memory data movement). In the exchange phase, there are no computations and therefore no concurrency hazards (or at least there are no computations that reply on data yet to be received from another tile 4). In the exchange phase, each datum moves along the connection wires on which it exits a tile from a transmitting tile to its recipient tile. At each clock cycle, datum moves a certain distance along its path (store to store), in a pipelined fashion. When a datum is issued from a tile, it is not issued with a header identifying a recipient tile. Instead, the recipient tile knows that it will be expecting a datum from a certain transmitting tile at a certain time. Thus, the computer described herein is time deterministic.

Each tile 4 runs a portion of the program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

Each tile 4 is associated with its own multiplexer 210. Each multiplexer has at least as many inputs as there are tile 4 on the chip, each input being connected to the switching fabric 34. The cross wires of the switching fabric are connected to a data-out set of connection wires 218 from each tile (a broadcast exchange bus). For ease of illustration, not all crosswire are shown in FIG. 16. One set of crosswires is labelled 140x to indicate that it is one of a number of sets of crosswires.

When the multiplexer 210 is switched to the input labelled 220x then that will connect to the crosswires 140x and thus to the data bus 218T of the transmitting (sending) tile 4T. If the multiplexer is controlled to switch to that input at a certain time, then the datum received on the data bus 230 which is connected to the crosswire 140x will appear at the output of the multiplexer 210 at a certain time. It will arrive at the receiving tile 4R a certain delay after that, the delay depending on the distance of the multiplexer 210 from the receiving tile 4R. As the multiplexers tend to be arranged close to the switching fabric, the delay from the tile to the multiplexer can vary depending on the location of the receiving tile 4R.

To implement the switching, the local programs executed on the tiles 4 include switch control instructions (PUTi) which cause a multiplexer control signal 214 to be issued to control the multiplexer 210 associated with that tile to switch its input at a certain time ahead of the time at which a particular datum is expected to be received at the tile. In the exchange phase, multiplexers are switched and packets (data) are exchanged between tiles using the switching fabric. It can be seen from this explanation that the internal interconnect 34 has no state and requires no queues—the movement of each datum is predetermined by the particular crosswire to which the input of each multiplexer is connected.

In the exchange phase, all tiles 4 are permitted to communicate with all other tiles within its sync group. Each tile 4 has control of its own unique input multiplexer 210. Incoming traffic can thus be selected from any other tile in the chip 2 (or from one of the external connection links in an external exchange). It is also possible for a multiplexer 210 to be set to receive a null input, i.e. no input, in any given exchange phase.

Each tile 4 has three interfaces: an "exin" interface 224 which passes data from the switching fabric 34 to the tile 4; an "exout" interface 226 which passes data from the tile to the switching fabric over the broadcast exchange bus 218; and an "exmux" interface 228 which passes the control mux signal 214 (mux-select) from the tile 4 to its multiplexer 210.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler, preferably at compile time, which needs to be aware of the following parameters.

Parameter I: the relative SYNC acknowledgement delay of each tile. This is a function of tile ID (TID) of the sending and receiving tiles, which is held in the TILE_ID register. This is a number of cycles always greater than or equal to 0 indicating when each tile receives the sync ack signal from the sync controller 36 relative to all other tiles. This can be calculated from the tile ID, noting that the tile ID indicates the particular location on the chip of that tile, and therefore reflects the physical distances. Put another way, the sync ack delays are equalized. If the transmitted tile 4T is closer to the sync controller 36 and the receiving tile 4R is further away, the consequence is that the sync acknowledgement delay will be shorter to the transmitting tile 4T than for the receiving tile 4R, and vice versa. A particular value will be associated with each tile for the sync acknowledgement delay. These values can be held for example in a delay table, or can be calculated on the fly each time based on the tile ID.

Parameter II: the exchange mux control loop delay. This is the number of cycles between issuing an instruction (PUTi MUXptr) that changes a tile's input mux selection and the earliest point at which the same tile could issue a (hypothetical) load instruction for exchange data stored in memory as a result of the new mux selection. This comprises the delay of the control signal getting from the exmux interface 228R of recipients tile 4R to its multiplexer 210R and the length of the line from the output of the multiplexer to the data input exin interface 224.

Parameter III: the tile to tile exchange delay. This is the number of cycles between a SEND instruction being issued on one tile and the earliest point at which the receiving tile could issue a (hypothetical) load instruction pointing to the sent value in its own memory. This can be calculated from the TIDs of the sending and receiving tiles, either by accessing a table, or by calculating on the fly. This delay includes the time taken for data to travel from transmit tile 4T from its exout interface 226T to the switching fabric 14 along its exchange bus 218T and then via the input mux 210R at the receiving tile 4R to the ex in interface 224R of the receiving tile.

Parameter IV: the exchange traffic memory pointer update delay. This is the number of cycles between issuing an instruction (PUTi MEMptr) that changes a tile's exchange input traffic memory pointer 232 and the earliest point at which that same tile could issue a (hypothetical) load instruction for exchange data stored in memory as a result of the new pointer. This is a small, fixed number of cycles. The memory pointer 232 acts as a pointer into the data memory 202 and indicates where incoming data from the exin interface 224 is to be stored.

Together these parameters give the total inter-tile delay that will be experienced between transmission of a datum from the transmitting tile 4T and receipt of that datum by the receiving tile 4R. The particular exchange mechanism and parameters above are given only by way of example. Different exchange mechanisms may differ in the exact composition of the delay, but as long as the exchange is kept time deterministic, then it can be known by the programmer or compiler and thus exchange without queues is possible.

Figure 17:
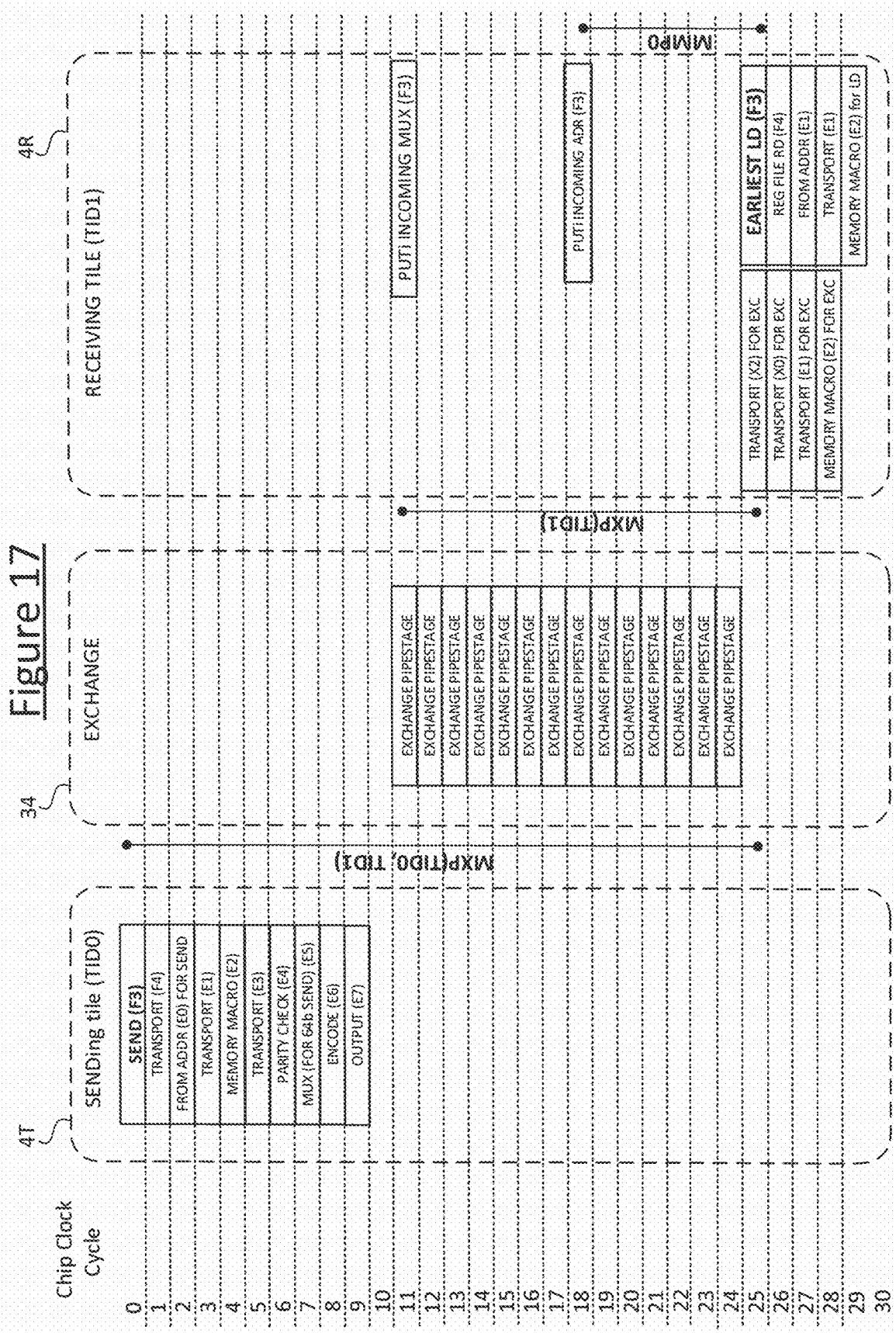

FIG. 17 shows the example exchange timings in more depth. On the left-hand side are shown the chip clock cycles running from 0-30. If the processor of the receiving tile 4R wants to act on a datum which was the output of a process on the transmitting tile 4T, then the transmitting tile 4T has to execute a SEND instruction send at a certain time (e.g. clock cycle 0 in FIG. 17), and the receiving tile 4R has to execute a switch control instruction PUTi EXCH MXptr (as in clock cycle 11) by a certain time relative to the execution of the SEND instruction on the transmitting tile. This will ensure that the data arrives at the recipient tile in time to be loaded for use in a code-let being executed at the recipient tile 4R.

Figure 19:
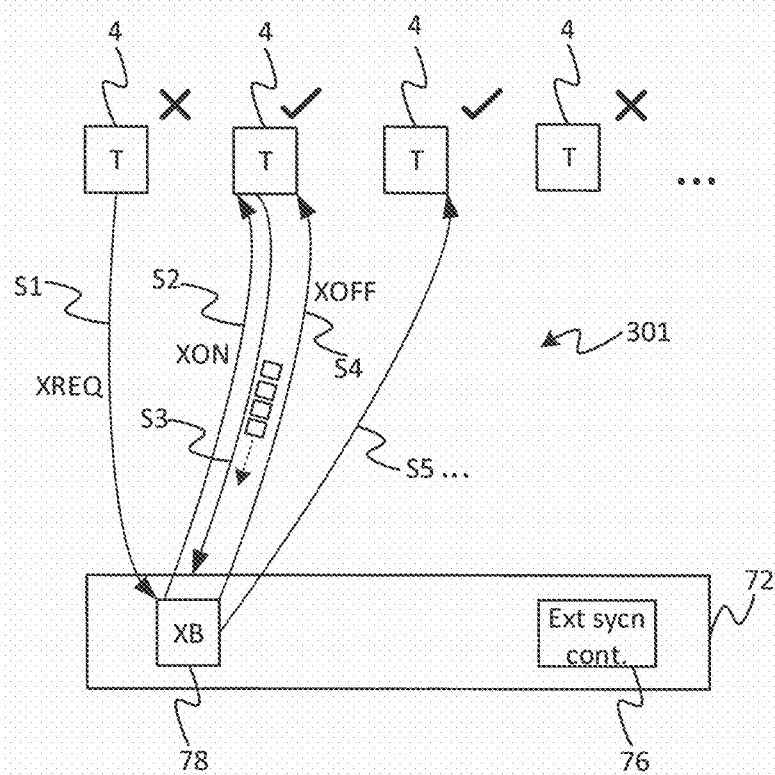

FIG. 19 illustrates an exemplary mechanism for communicating off-chip (external exchange). This mechanism is non-time-deterministic. The mechanism is implemented in dedicated hardware logic in the external interconnect 72. Data is sent over the external interconnect 72 in the form of packets. Unlike the packets sent over the internal interconnect, these packets have headers: as the order of transmission can change, they require the destination address to be present in the packet header. Also in embodiments the external interconnect 72 takes the form of a network and therefore requires additional information for routing purposes.

At the physical layer the interconnect mechanism is lossy, but at the transaction layer the mechanism is not lossy due to the architecture of the link layer: if a packet is not acknowledged it will be resent automatically by the hardware in the interconnect 72. The possibility for loss and resending at the data link layer however means that the delivery of data packets over the external interconnect is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send to another tile or tiles 4 on another chip 2. This is illustrated schematically in FIG. 19 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 78 (operation S3). If at any time the XB is unable to continue sending packets to the interconnect (e.g. due to a previous packet loss and retransmission in the interconnect, or due to over-subscription of the external interconnect by many other XBs and tiles) the XB will send an exchange-off (XOFF) to that tile before the XBs queue overflows. Once the congestion is cleared and the XB again has sufficient space in its queue it will send an XON to the tile allowing it to continue transmitting its content. Once this tile has sent its last data packet, then in operation S4 the exchange block 78 sends an exchange-off (XOFF) control packet to this tile, then in operation S5 sends another XON to the next tile 4 with data packets to send, and so forth. The signalling of XON and XOFF are implemented as a hardware mechanism in dedicated hardware logic in the form of the external exchange block 78.

It will be appreciated that this is just one example of a flow control mechanism for communicating external between chips. Other suitable mechanisms, in themselves, will be familiar to a person skilled in the art. Also, the possibility of a time-deterministic and/or queue-less external interconnect is not excluded.

Figure 15:
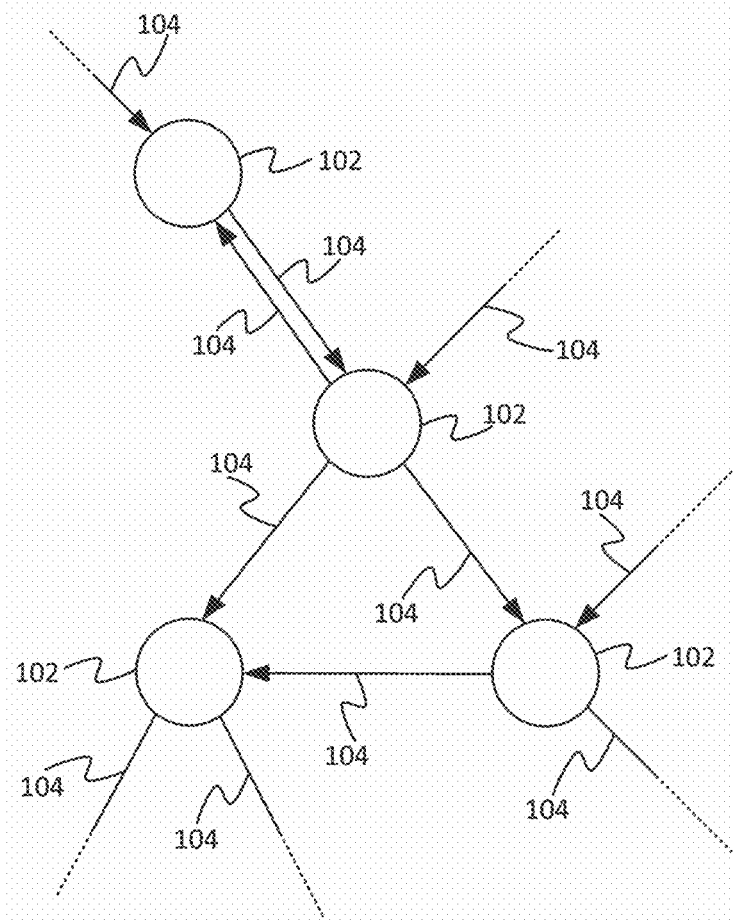
FIG. 15 is a schematic illustration of a graph used in a machine intelligence algorithm, FIG. 16 schematically illustrates an arrangement for exchanging data between tiles, FIG. 17 schematically illustrates a scheme of exchange timings.

FIG. 15 illustrates an example application of the processor architecture disclosed herein, namely an application to machine intelligence.

As will be familiar to a person skilled in the art of machine intelligence, machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case at least some of the edges 104 between nodes 102 correspond to the exchanges of data between threads, and some may involve exchanges between tiles. Furthermore, the individual exit states of the worker threads are used by the programmer to represent whether or not the respective node 102 has satisfied its respective condition for convergence of the parameter(s) of that node, i.e. has the error in the parameter or parameters fallen within the acceptable level or region in error space. For instance, this is one example use of the embodiments where each of the individual exit states is an individual bit and the aggregated exit state is an AND of the individual exit states (or equivalently an OR if 0 is taken to be positive); or where the aggregated exit state is a trinary value representing whether the individual exit states were all true, all false or mixed. Thus, by examining a single register value in the exit state register 38, the program can determine whether the graph as whole, or at least a sub-region of the graph, has converged to an acceptable degree.

As another variant of this, embodiments may be used where the aggregation takes the form of a statistical aggregation of individual confidence values. In this case each individual exit state represents a confidence (e.g. as a percentage) that the parameters of the node represented by the respective thread have reached an acceptable degree of error. The aggregated exit state can then be used to determine an overall degree of confidence as to whether the graph, or a subregion of the graph, has converged to an acceptable degree.

In the case of a multi-tile arrangement 6, each tile runs a subgraph of the graph. Each subgraph comprises a supervisor subprogram comprising one or more supervisor threads, and a set of worker threads in which some or all of the workers may take the form of codelets.

It will be appreciated that the above embodiments have been described by way of example only.

The above has described various exampled techniques whereby a second processor (e.g. accelerator) 2 can send to a first processor (e.g. host) 93H/GW a descriptor of an interaction intended for the next step s+1, in order for the first processor to prepare its memory 306. More generally this principle can be extended to other preparatory operations, not limited to memory. E.g. if host or first CPU is controlling some bufferless routing fabric between the second subsystem and some other, remote system, then the parameter(s) could comprise a source of destination address in the remote system and the preparation by the first (routing) subsystem could comprise setting the routing switches of the routing fabric.

A step for the present purposes can be any instance of a period of time that the second processor executes for that has an external visible effect. A step is not necessarily a BSP superstep, for example because some BSP steps have no external effect. Further, the applicability of the present disclosure is not necessarily limited to a BSP scheme. Nor is it necessarily limited to the use of a host sync proxy 98, nor the particular scheme of sync requests and acks, nor the sync network 96, as the mechanism for implementing synchronization. More generally the disclosed concepts can apply to any synchronization scheme whereby steps (stages of execution) are separated by barrier synchronizations involving synchronization between any first and second processing subsystem.

The scope of the disclosure is also not limited to a second subsystem 300 comprising multi-tile processor chips, nor multiple processors or chips. It is also not limited to gateways. More generally the technique of sending an advance descriptor can be applicable to any arrangement of host subsystem and accelerator subsystem, where the host subsystem comprises one or more host processors and the accelerator comprises one or more accelerator subsystems. Further, the two subsystems do not necessarily have to have a host-accelerator relationship. Can be applicable in any scenario where one processor is required to have data or memory space available for another processor in a subsequent step beyond a barrier synchronization.

On a given tile or processor, the implementation is not limited to the above-described architecture in which a separate context is provided for the supervisor thread, or in which the supervisor thread runs in a slot and then relinquishes its slot to a worker. The supervisor could instead use a general purpose context. Or in another arrangement for example, the supervisor may run in its own dedicated slot. Further, the implementation is not limited to specific one of the threads even having a supervisor role, or indeed to multi-threading at all. The techniques disclosed herein may even be used in scenarios where one, some or all of the tiles on one, some or all of the chips employ non-multithreaded execution.

Where used, the applicability of a host sync proxy is not limited to systems allowing selection between different sync groupings. Even in a system having only a single sync domain (single group of tiles 4 across which a barrier synchronization is performed), it would still be beneficial to be able to reduce the amount of host interaction by setting a certain number of barriers that the tiles 4 are allowed to pass through before deferring to the host 93.

Further, though embodiments have been exemplified in terms of a PCI interface between cards or with the host 93, this is not limiting and other types of interface could be used, e.g. Ethernet.

Further, the scope of the present disclosure is not limited to a time-deterministic internal interconnect or a non-time-deterministic external interconnect. The mechanism disclosed herein can also be used in a completely time-deterministic arrangement, or in a completely non-time-deterministic arrangement.

Where a split between time-deterministic and non-time-deterministic realms is used, it would also be possible to make the divide between the time-deterministic and non-time-deterministic realms in other ways. For instance it is not excluded to extend the time-deterministic domain across multiple chips 2, with different multi-chip time deterministic domains being connected by a non-time-deterministic interconnect (e.g. the different multi-chip time-deterministic domains being implemented on different cards or server chassis). Or as another example, different time-deterministic domains could be implemented on a given chip 2, with a non-time-deterministic on-chip interconnect being provided between such domains.

Further, where a time-deterministic interconnect is used, the implementation is not limited to use of an inter-tile delay look up table. Instead for example an analytical formula could be used to determine the inter-tile delay. Further, the inter-tile delay and the send and receive timings are not limited to being set by the compiler. E.g. alternatively they could be arranged manually by the programmer.

Where multithreaded tiles are used, the terms "supervisor" and "worker" do not necessarily have to imply specific responsibilities expect where otherwise explicitly stated, and particularly are do not in themselves necessarily limit to the above-described scheme in which a supervisor thread relinquishes its time slot to a worker, and so forth. In general, worker thread may refer to any thread to which some computational task is allocated. The supervisor may represent any kind of overseeing or coordinating thread responsible for actions such as: assigning workers to barrel slots (execution channels), and/or performing barrier synchronizations between multiple threads, and/or performing any control-flow operation (such as a branch) in dependence on the outcome of more than one thread.

Where reference is made to a sequence of interleaved time slots, or the like, this does not necessarily imply that the sequence referred to makes up all possible or available slots. For instance, the sequence in question could be all possible slots or only those currently active. It is not necessarily precluded that there may be other potential slots that are not currently included in the scheduled sequence.

The term tile as used herein does not necessarily limit to any particular topography or the like, and in general may refer to any modular unit of processing resource comprising a processing unit 10 and corresponding memory 11, in an array of like modules, typically on the same chip (same die).

Furthermore, where reference is made herein to performing a synchronization or an aggregation between a group of tiles, or a plurality of tiles or the like, this does not necessarily have to refer to all tile on the chip or all tiles in the system unless explicitly stated. E.g. the SYNC and EXIT instructions could be configured to perform the synchronization and aggregation only in relation to a certain subset of tiles 4 on a given chip and/or only a subset of chips 2 in a given system; whilst some other tiles 4 on a given chip, and/or some other chips in a given system, may not be involved in a given BSP group, and could even be being used for some completely separate set of tasks unrelated to the computation being performed by the group at hand.

Further, the above-described synchronization schemes do not exclude the involvement, in embodiments, of external resources that are not processors such as one or more network cards, storage devices and/or FPGAs. For instance, some tiles may elect to engage in data transfers with an external system where these transfers form the computational burden of that tile. In this case the transfers should be completed before the next barrier. In some cases the exit state of the tile may depend on a result of the communication with the external resource, and this the resource may vicariously influence the exit state. Alternatively or additionally, resources other than multi-tile processors, e.g. the host or one or more FPGAs, could be incorporated into the synchronization network itself. That is to say, a sync signal such as a Sync_req is required from this/these additional resources in order for the barrier synchronization to be satisfied and the tiles to proceed to the next exchange phase. Further, in embodiments the aggregated global exit state may include in the aggregation an exit state of the external resource, e.g. from an FPGA.

Also, while certain modes of SYNC instruction have been described above, the scope of the present disclosure more generally is not limited to such modes. For instance, the list of modes given above is not necessarily exhaustive. Or in other embodiments, the SYNC instruction may have fewer modes, e.g. the SYNC need not support different hierarchical levels of external sync, or need not distinguish between on-chip and inter-chip syncs (i.e. in an inter-tile mode, always acts in relation to all tiles regardless of whether on chip or off chip).

In further variations, the SYNC instruction could take a greater number of possible modes to accommodate a greater granularity or range of hierarchical sync zones 91, 92; or simply a different set of modes to accommodate different division of the system into hierarchical zones. For instance, as well as allowing selection between internal (on-chip) and external (off-chip) synchronization (or even as an alternative to this), the modes of the SYNC instruction may be configured to recognize other physical breakpoints further out beyond one chip (e.g. one IC package, one card, one box of cards etc.). Or even if no dedicated SYNC instruction is used, such divisions may be implemented by the programmer or compiler using general purpose code. So in embodiments, one of the hierarchical sync zones (e.g. one of the modes of the SYNC instruction) may consist of all the tiles on all the chips on the same IC package (but none of the tiles or chips beyond that). Alternatively or additionally, one of the hierarchical sync zones (e.g. again one of the modes of the SYNC instruction) may consist of all the tiles on all the chips on the same card (but none of the tiles, chips or packages beyond that). As another alternative or additional example, one of the hierarchical sync zones (e.g. again another possible mode of the SYNC instruction) may consist of all the tiles on all the chips on all the cards in the same physical box, e.g. same chassis (but none of the tiles, chips or boxes beyond that). This would be advantageous because communication between IC packages, cards and boxes will tend to incur an even greater penalty than just between chips (dies) in the same package.

Furthermore, the sync zones are not limited to being hierarchical (i.e. one nested in another), and in other embodiments the selectable sync zones may consist of or include one or more non-hierarchical groups (all tiles of that group not nested within a single other selectable group).

In yet further variants, the synchronization is not limited to being performed using dedicated SYNC instructions, nor the EXIT instructions. In other cases the synchronization functionality could be achieved using general purpose code. Further, where the SYNC instruction and/or EXIT instructions are used, they do not necessarily have to have the described function of aggregating exit states.

Other applications and variants of the disclosed techniques may become apparent to a person skilled in the art once given the disclosure herein. The scope of the present disclosure is not limited by the described embodiments but only by the accompanying claims.

What is claimed is:

1. A processing system comprising:
a first subsystem comprising one or more first processors, and
a second subsystem comprising one or more second processors;
wherein the second subsystem is configured to process code over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem;
wherein the second subsystem is configured, in a current one of said steps, to send a descriptor to the first subsystem specifying a value of each of one or more parameters of each of one or more interactions that the second subsystem is programmed to perform with the first subsystem via an inter-processor interconnect in a subsequent one of said steps; and
wherein the first subsystem is configured to execute a portion of code to perform one or more preparatory operations, based on the specified values of at least one of the one or more parameters of each interaction as specified by the descriptor, to prepare for said one or more interactions prior to the barrier synchronization leading into said subsequent step.

2. The processing system of claim 1, wherein:
the first subsystem stores one or more look-up tables mapping each of a set of behaviour IDs to a different respective one of a plurality of different possible predetermined definitions for said interaction, each definition comprising a respective set of values for said one or more parameters;
the descriptor specifies the specified values of the one or more parameters of each interaction by indicating one of the behaviour IDs; and
the first subsystem is configured to determine the specified values by looking up the definition mapped to the indicated behaviour ID in said one or more look-up tables, and to perform said one or more preparatory operations based on the respective set of values of the looked-up definition.

3. The processing system of claim 1, wherein at least one of the one or more interactions is to transfer data between the second subsystem and a memory of the first subsystem, and wherein the one or more preparatory operations comprise one or more operations to prepare the memory for the transfer.

4. The processing system of claim 3, wherein the at least one parameter comprises a direction of the transfer, the direction being either: incoming from the second subsystem to the memory of the first subsystem, or outgoing from the memory of the first subsystem to the second subsystem.

5. The processing system of claim 3, wherein the transfer comprises transferring an incoming portion of data from the second subsystem to the memory of the first subsystem, wherein said at least one parameter comprises at least a size of the incoming portion of data, and wherein said one or more preparatory operations comprise at least: reserving a corresponding amount of space in the memory ready to accept the incoming portion of data from the second subsystem in the subsequent step.

6. The processing system of claim 1, wherein the transfer comprises transferring an outgoing portion of data to the second subsystem from the memory of the first subsystem, wherein said at least one parameter comprises at least a size of the outgoing portion of data, and wherein said one or more preparatory operations comprise one, more or all of: reserving a corresponding amount space in the memory to store the outgoing portion of data, generating the outgoing portion of data, and storing the outgoing portion of data in the memory ready to send to the second subsystem in the subsequent step.

7. The processing system of claim 5, wherein the memory comprises a first-in, first-out (FIFO) buffer and the reserved space is space in the FIFO.

8. The processing system of claim 3, wherein at least one of said one or more interactions is to transfer the data as part of a stream; and wherein the one or more parameters for each stream comprise at least a stream ID identifying a stream, an indication that the second subsystem is to begin streaming between the second subsystem and the memory of the first subsystem in the subsequent step, and a direction of the stream.

9. The processing system of claim 2, wherein:
at least one of the one or more interactions is to transfer data between the second subsystem and a memory of the first subsystem, and wherein the one or more preparatory operations comprise one or more operations to prepare the memory for the transfer;

the at least one parameter comprises a direction of the transfer, the direction being either: incoming from the second subsystem to the memory of the first subsystem, or outgoing from the memory of the first subsystem to the second subsystem;

at least one of said one or more interactions is to transfer the data as part of a stream, wherein the one or more parameters for each stream comprise at least a stream ID identifying a stream, an indication that the second subsystem is to begin streaming between the second subsystem and the memory of the first subsystem in the subsequent step, and a direction of the stream; and the stream ID is mapped to the behaviour ID in a first of said look-up tables, and wherein the portion size and direction are mapped to the stream ID in a second of said look-up tables.

10. The processing system of claim 1, wherein said subsequent step is the next step following the current step in said series by default.

11. The processing system of claim 1, wherein said subsequent step is operable to be any of a number of steps following the current step in said series, wherein said number is specified by the descriptor.

12. The processing system of claim 1, wherein the descriptor specifies at least one interaction for each of the next N steps following the current step in said series, where N is specified by the descriptor; the first subsystem being configured to prepare for each of said N steps prior to the respective barrier leading into each.

13. The processing system of claim 1, comprising synchronization logic configured to return the synchronization acknowledgement signal to the second subsystem on condition of: i) receiving a synchronization request signal from the second subsystem, and ii) receiving permission from the first subsystem system to return the synchronization acknowledgement.

14. The processing system of claim 13, wherein the synchronization logic comprises a register for storing a number of credits, the register being writeable by the first subsystem; wherein said permission is granted when the register is written with at least one credit but denied when the credits are exhausted; and wherein the synchronization logic is configured to automatically decrement the number of credits in the register each time an instance of the synchronization acknowledgement signal is returned to the second subsystem.

15. The processing system of claim 1, wherein each of the one or more second processors comprises an array of tiles each comprising a respective execution unit and memory, the tiles being arranged to exchange data with one another by an inter-tile interconnect.

16. The processing system of claim 3, wherein each of the one or more second processors comprises an array of tiles each comprising a respective execution unit and memory, the tiles being arranged to exchange data with one another by an inter-tile interconnect; and the inter-tile interconnect is a time-deterministic interconnect for exchanging data between the tiles in a time-deterministic manner, but the inter-processor interconnect is a non-time-deterministic interconnect for performing said transfer of data between the first subsystem and second subsystem only in a non-time-deterministic manner.

17. The processing system of claim 13, wherein:
each of the one or more second processors comprises an array of tiles each comprising a respective execution unit and memory, the tiles being arranged to exchange data with one another by an inter-tile interconnect; and
the first second subsystem is configured to send said synchronization request on condition of receiving an individual request for synchronization from each of the tiles.

18. The processing system of claim 1, wherein the second subsystem comprises a plurality of second processors configured to communicate via the inter-processor interconnect.

19. The processing system of claim 13, wherein:
the second subsystem comprises a plurality of second processors configured to communicate via the inter-processor interconnect; and
the second subsystem is configured to send said synchronization request on condition of receiving an individual request for synchronization from each of said plurality of second processors.

20. The processing system of claim 1, wherein the
the first subsystem comprises a host subsystem, the one or more first processors comprising at least one host CPU and optionally one or more gateway processors arranged as a gateway between the host CPU and the second subsystem; and
the second subsystem comprises an accelerator subsystem, the one or more second processors comprising one or more accelerator processors arranged to perform work allocated by the host CPU.

21. The processing system of claim 1, wherein each of said steps comprises a bulk synchronous parallel, BSP, superstep; each superstep comprising an exchange phase following the barrier synchronization, wherein in the exchange phase the first and second subsystems perform said interaction, and a compute phase following the exchange phase, wherein in the exchange phase the first and second subsystems perform only computations or internal exchanges but not exchanges between the first and second subsystems, and wherein the next barrier synchronization follows the compute phase.

22. The processing system of claim 1, wherein the code on the second subsystem and the portion of code on the first subsystem are statically pre-compiled to operate together to perform said interaction.

23. A method of operating a system comprising a first subsystem comprising one or more first processors, and a second subsystem comprising one or more second processors, the method comprising:
arranging the second subsystem to process code over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem;
in a current one of said steps, sending a descriptor from the second subsystem to the first subsystem specifying a value of each of one or more parameters of each of one or more interactions that the second subsystem is programmed to perform with the first subsystem via an inter-processor interconnect in a subsequent one of said steps; and
on the first subsystem, executing a portion of code to perform one or more preparatory operations, based on the specified values of at least one of the one or more parameters of each interaction as specified by the descriptor, to prepare for said one or more interactions prior to the barrier synchronization leading into said subsequent step.

24. A non-transitory computer-readable storage medium having stored thereon computer-executable code configured so as when run on a system comprising a first subsystem comprising one or more first processors, and a second subsystem comprising one or more second processors, to perform operations of:

controlling the second subsystem to run at least part of the program over a series of steps, each next step in the series being delineated from its preceding step by a barrier synchronization whereby the second subsystem waits to advance to the next step until the second subsystem receives a synchronization acknowledgement signal indicating that the advancement is agreed by the first subsystem;

in a current one of said steps, controlling the second subsystem to send a descriptor to the first subsystem specifying a value of each of one or more parameters of each of one or more interactions that the second subsystem is programmed to perform with the first subsystem via an inter-processor interconnect in a subsequent one of said steps; and controlling the first subsystem to perform one or more preparatory operations, based on the specified values of at least one of the one or more parameters of each interaction as specified by the descriptor, to prepare for said one or more interactions prior to the barrier synchronization leading into said subsequent step.

* * * * *